US012755710B2

(12) United States Patent
Hwang

(10) Patent No.: US 12,755,710 B2
(45) Date of Patent: Oct. 6, 2026

(54) DISPLAY DEVICE AND DISPLAY DRIVING METHOD

(71) Applicant: LG Display Co., Ltd., Seoul (KR)

(72) Inventor: JongHee Hwang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/189,676

(22) Filed: Apr. 25, 2025

(65) Prior Publication Data

US 2026/0148700 A1 May 28, 2026

(30) Foreign Application Priority Data

Nov. 22, 2024 (KR) ........................ 10-2024-0168453

(51) Int. Cl.
*G09G 3/3291* (2016.01)
*G09G 3/32* (2016.01)
*G09G 3/3266* (2016.01)

(52) U.S. Cl.
CPC ............. *G09G 3/3291* (2013.01); *G09G 3/32* (2013.01); *G09G 3/3266* (2013.01); *G09G 2300/043* (2013.01); *G09G 2310/0267* (2013.01); *G09G 2310/0275* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 11,436,986 | B2 | 9/2022 | Kim | |
| 11,984,082 | B2 | 5/2024 | Bae et al. | |
| 2018/0122302 | A1* | 5/2018 | Koong | G09G 3/3266 |
| 2018/0322844 | A1* | 11/2018 | Lee | G09G 5/10 |
| 2019/0206973 | A1* | 7/2019 | Kim | H10D 86/00 |
| 2021/0390911 | A1* | 12/2021 | Kim | G09G 3/3266 |
| 2021/0398472 | A1* | 12/2021 | Kim | G09G 3/3266 |
| 2022/0157243 | A1* | 5/2022 | Baek | G09G 3/3233 |
| 2022/0215798 | A1* | 7/2022 | Pyun | G09G 3/2096 |
| 2022/0375413 | A1* | 11/2022 | Pyun | G09G 3/3275 |
| 2024/0112630 | A1* | 4/2024 | Bae | G09G 3/3233 |
| 2025/0371903 | A1* | 12/2025 | Park | G06V 40/13 |

FOREIGN PATENT DOCUMENTS

| | | | | |
|---|---|---|---|---|
| KR | 20160078640 A | * 7/2016 | | H10K 71/00 |
| KR | 10-2017-0080935 A | 7/2017 | | |
| KR | 10-2021-0153395 A | 12/2021 | | |
| KR | 10-2024-0048040 A | 4/2024 | | |

* cited by examiner

*Primary Examiner* — Kenneth Bukowski
(74) *Attorney, Agent, or Firm* — Fenwick & West LLP

(57) ABSTRACT

A display device may comprise a display panel including a first subpixel group and a second subpixel group having different structures on a silicon substrate, a gate driving circuit supplying a gate signal to the display panel, a data driving circuit supplying a data voltage to the display panel, and a timing controller controlling the gate driving circuit and the data driving circuit and sensing a characteristic value of a driving transistor included in the first subpixel group through a reference voltage line. In the first subpixel group, a first driving transistor included in each subpixel may be electrically connected to the reference voltage line through a sensing transistor, and in the second subpixel group, a second driving transistor included in each subpixel may not be electrically connected to the reference voltage line.

18 Claims, 18 Drawing Sheets

| Vref – EVSS[0] | IED [A] | Vref – EVSS[100] | Shift [V] |
|---|---|---|---|
| ⋮ | ⋮ | ⋮ | ⋮ |
| 2.2 | IEDm | 2.31 | 0.11 |

| Vref – EVSS[0] | IED [A] | Vref – EVSS[100] | Shift [V] |
|---|---|---|---|
| ⋮ | ⋮ | ⋮ | ⋮ |
| 2.2 | IEDm | 2.31 | 0.11 |

DISPLAY DEVICE AND DISPLAY DRIVING METHOD

CROSS-REFERENCE TO RELATED APPLICATION

This application claims priority from Republic of Korea Patent Application No. 10-2024-0168453 filed on Nov. 22, 2024, which is hereby incorporated by reference in its entirety.

BACKGROUND

Field

Embodiments of the disclosure relate to a display device and a display driving method, and more particularly, to a display device and a display driving method capable of effectively sensing and compensating for a characteristic value of a driving transistor.

Description of Related Art

The growth of the intelligent society leads to increased demand for image display devices and use of various types of display devices, such as liquid crystal displays, organic light emitting displays, etc.

Among these display devices, the organic light emitting display device uses self-emissive organic light emitting diodes, providing advantages, such as a fast response and better contrast ratio, luminous efficiency, luminance, and viewing angle.

The display device may include light emitting elements respectively arranged in a plurality of subpixels disposed on a display panel and cause the light emitting diodes to emit light by controlling the voltage applied to the light emitting elements, thereby displaying images while controlling the brightness of each subpixel.

Meanwhile, many different electronic devices requiring small display devices, such as virtual reality (VR) devices and augmented reality (AR) devices, are emerging, and accordingly, micro display devices with very small display panels have been proposed.

These display devices are formed to have semiconductor chips in the form of integrated circuits (ICs) on a silicon substrate (silicon semiconductor substrate) and, in many cases, various driving circuits as well as the display panel in the display device are integrally formed.

As such, as the display device implementing virtual reality adopts a silicon substrate, the characteristic value of the driving transistor may easily be changed due to high thermal conductivity, causing a change in the light emission current flowing through the light emitting element and a reduction in brightness.

SUMMARY

Embodiments of the disclosure may provide a display device and a display driving method capable of effectively detecting and compensating for a characteristic value of a driving transistor formed on a silicon substrate.

Embodiments of the disclosure may provide a display device including a simple sensing structure for a characteristic value of a driving transistor considering the thermal conductivity of a silicon substrate and a display driving method.

Embodiments of the disclosure may provide a display device and a display driving method capable of real-time sensing and compensation in a blank interval of a display driving process using a simple sensing structure for a characteristic value of a driving transistor.

Embodiments of the disclosure may provide a display device and a display driving method capable of simultaneously compensating for a change in threshold voltage due to a body effect and a change in characteristic value due to deterioration of a driving transistor in a blank interval using a simple sensing structure for the characteristic value of the driving transistor.

Objects of embodiments of the disclosure are not limited to those set forth herein, and other unmentioned objects would be apparent to one of ordinary skill in the art from the following description.

Embodiments of the disclosure may provide a display device of the disclosure comprising a display panel including a first subpixel group and a second subpixel group having different structures on a silicon substrate, a gate driving circuit supplying a gate signal to the display panel, a data driving circuit supplying a data voltage to the display panel, and a timing controller controlling the gate driving circuit and the data driving circuit and sensing a characteristic value of a driving transistor included in the first subpixel group through a reference voltage line, wherein in the first subpixel group, a first driving transistor included in each subpixel may be electrically connected to the reference voltage line through a sensing transistor, and in the second subpixel group, a second driving transistor included in each subpixel may not be electrically connected to the reference voltage line.

Embodiments of the disclosure may provide a display driving method driving a display panel including a first subpixel group and a second subpixel group having different structures on a silicon substrate, comprising sensing a first characteristic value of a driving transistor included in the first subpixel group through a reference voltage line in a first sensing interval, varying a pixel low-potential voltage supplied to a cathode electrode of a light emitting element included in the first subpixel group and sensing a second characteristic value of the driving transistor, in a second sensing interval, and supplying a compensation voltage to the display panel according to the first characteristic value or the second characteristic value.

According to embodiments of the disclosure, there may be provided a display device and a display driving method capable of effectively detecting and compensating for a characteristic value of a driving transistor formed on a silicon substrate.

According to embodiments of the disclosure, there may be provided a display device and a display driving method capable of weight reduction and low-power driving through a simple sensing structure for a characteristic value of a driving transistor considering the thermal conductivity of a silicon substrate.

According to embodiments of the disclosure, there may be provided a display device and a display driving method capable of real-time sensing and compensation in a blank interval of a display driving process using a simple sensing structure for a characteristic value of a driving transistor.

According to embodiments of the disclosure, there may be provided a display device and a display driving method capable of simultaneously compensating for a change in threshold voltage due to a body effect and a change in characteristic value due to deterioration of a driving transistor in a blank interval using a simple sensing structure for the characteristic value of the driving transistor.

The effects of the disclosure are not limited to the foregoing objects, and other effects will be apparent to one of ordinary skill in the art from the following detailed description.

BRIEF DESCRIPTION OF DRAWINGS

The disclosure will be more fully understood from the following detailed description and the accompanying drawings, which are provided for illustration only and are not intended to limit the disclosure.

DETAILED DESCRIPTION

Figure 1:
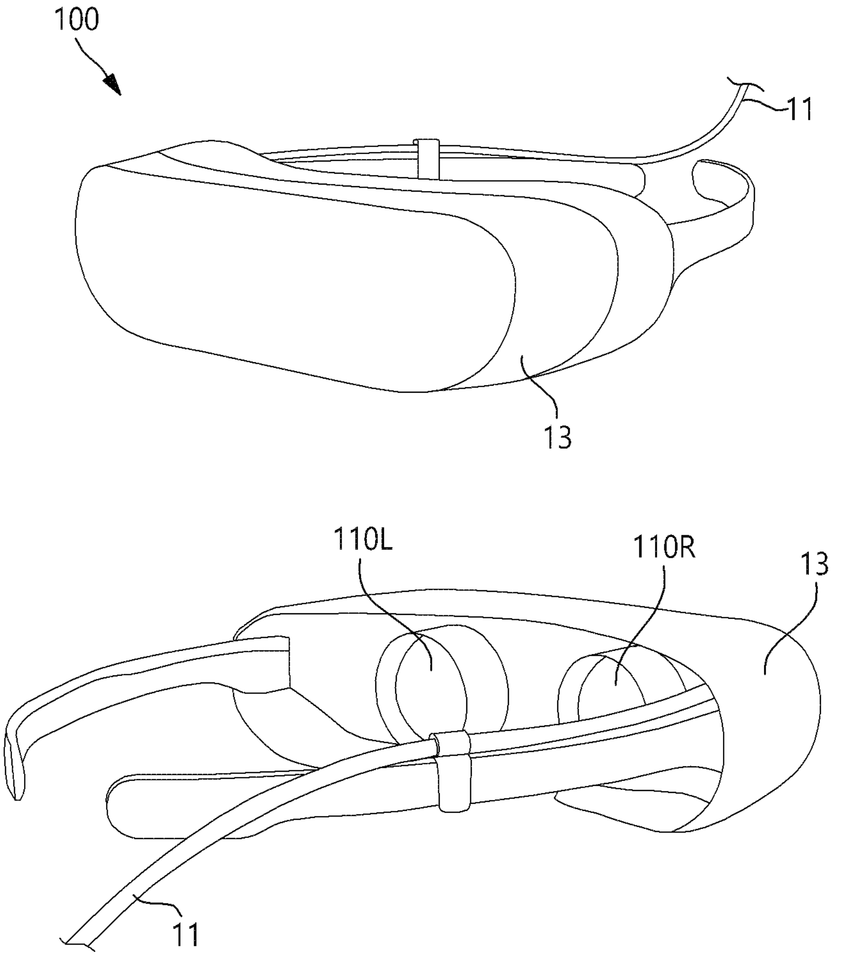
FIG. 1 is a view schematically illustrating a display device according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

FIG. 1 is a view schematically illustrating a display device according to various embodiments of the disclosure.

Referring to FIG. 1, the display device 100 according to embodiments of the disclosure may be a display device capable of displaying an image of virtual reality (VR), augmented reality (AR), extended reality (XR), or mixed reality (MR). For example, the display device 100 of the disclosure may include a head mounted display (HMD)-type device, which is a type of wearable device.

The display device 100 may include an image signal input unit 11 to which image data is input, a first display panel 110L on which a first image (e.g., a left-eye image) based on an image signal is displayed, a second display panel 110R on which a second image (e.g., a right-eye image) based on an image signal is displayed, and a case 13.

The image signal input unit 11 may include a wired cable or a wireless communication module connected to a host system (e.g., a smartphone, a laptop, etc.) that outputs image data. Here, although the image signal input unit 11 is illustrated as a wired line, the image signal input unit 11 may be implemented as a wireless interface.

The first display panel 110L and the second display panel 110R are formed at positions corresponding to the user's left eye and right eye. The combination of the first display panel 110L, the second display panel 110R, and a driving circuit for driving them may be referred to as the display device 100.

Further, the display device 100 of the disclosure may include two display panels 110R and 110L, but may also display an image in a virtual space through one display panel.

Figure 2:
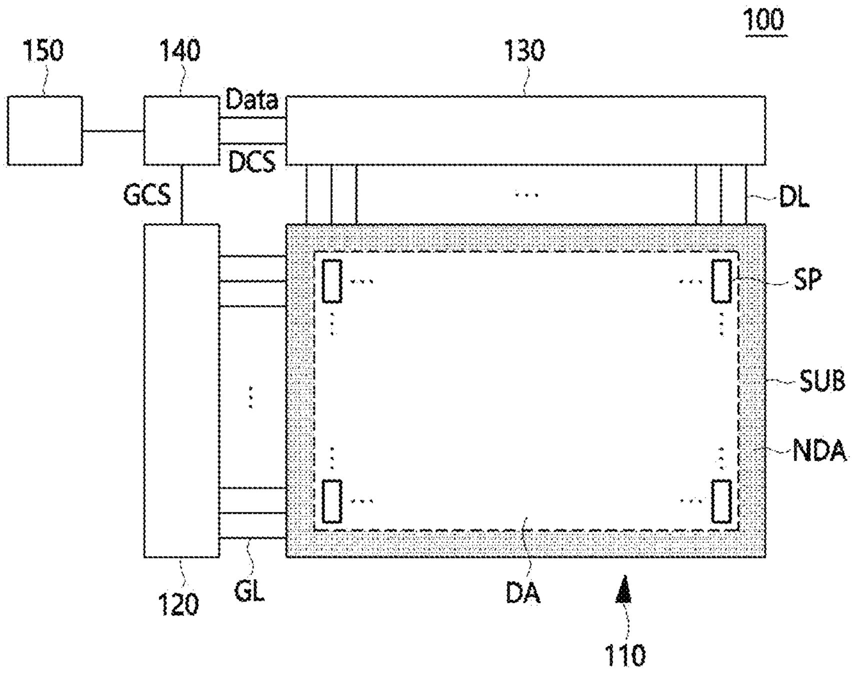
FIG. 2 is a view illustrating a configuration of a system of a display device according to embodiments of the disclosure.

FIG. 2 is a view illustrating a configuration of a system of a display device according to embodiments of the disclosure.

Referring to FIG. 2, a display device 100 according to embodiments of the disclosure may include a display panel 110 and a driving circuit for driving the display panel 110.

The display panel 110 may include a display area DA in which images are displayed and a non-display area NDA in which no image is displayed. The non-display area NDA may also be referred to as a bezel area.

The display panel 110 may include a plurality of subpixels SP formed on a substrate SUB for image display.

A plurality of subpixels SP may be disposed in the display area DA. In some cases, at least one subpixel SP may be disposed in the non-display area NDA. At least one subpixel SP disposed in the non-display area NDA is also referred to as a dummy subpixel.

The display panel 110 may include a plurality of signal lines for driving a plurality of subpixels SP. For example, the plurality of signal lines may include a plurality of data lines DL and a plurality of gate lines GL. The signal lines may further include other signal lines than the plurality of data lines DL and the plurality of gate lines GL according to the structure of the subpixel SP. For example, the other signal lines may include driving voltage lines and reference voltage lines.

The plurality of data lines DL and the plurality of gate lines GL may cross each other. Each of the plurality of data lines DL may be disposed while extending in a first direction. Each of the plurality of gate lines GL may be disposed while extending in a second direction. Here, the first direction may be a column direction and the second direction may be a row direction. In the disclosure, the column direction and the row direction are relative. For example, the column direction may be a vertical direction and the row direction may be a horizontal direction. As another example, the column direction may be a horizontal direction and the row direction may be a vertical direction.

The driving circuit may include a data driving circuit 130 for driving a plurality of data lines DL and a gate driving circuit 120 for driving a plurality of gate lines GL. The driving circuit may further include a timing controller 140 for controlling the data driving circuit 130 and the gate driving circuit 120.

The data driving circuit 130 is a circuit for driving the plurality of data lines DL, and may output data signals (also referred to as data voltages) corresponding to image signals to the plurality of data lines DL. The gate driving circuit 120 is a circuit for driving the plurality of gate lines GL and may generate gate signals, and output the gate signals to the plurality of gate lines GL. The gate signal may include one or more scan signals and light emission signals.

The timing controller 140 may start a scan according to the timing implemented in each frame and may control data driving at an appropriate time according to the scan. The timing controller 140 may convert input image data input from the outside to suit the data signal format used by the data driving circuit 130 and supply the converted image data DATA to the data driving circuit 130.

The timing controller 140 may receive display driving control signals, along with input image data, from an external host system 200. For example, the display driving control signals may include a vertical synchronizing signal, a horizontal synchronizing signal, an input data enable signal, and a clock signal, but embodiments of the disclosure are not limited thereto.

The timing controller 140 may generate the data driving control signal DCS and the gate driving control signal GCS based on display driving control signals input from the host system 200. The timing controller 140 may control the driving operation and driving timing of the data driving circuit 130 by supplying the data driving control signal DCS to the data driving circuit 130. The timing controller 140 may control the driving operation and driving timing of the gate driving circuit 120 by supplying the gate driving control signal GCS to the gate driving circuit 120.

The data driving circuit 130 may include one or more source driving integrated circuits SDIC. Each source driving integrated circuit may include a shift register, a latch circuit, a digital to analog converter (DAC), an output buffer, or the like, but embodiments of the disclosure are not limited thereto. In some cases, each source driving integrated circuit may further include an analog to digital converter (ADC).

For example, each source driving integrated circuit may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110, but embodiments of the disclosure are not limited thereto.

The gate driving circuit 120 may output a gate signal of a turn-on level voltage or a gate signal of a turn-off level voltage according to the control of the timing controller 140. The gate driving circuit 120 may sequentially drive the plurality of gate lines GL by sequentially supplying gate signals of the turn-on level voltage to the plurality of gate lines GL.

The gate driving circuit 120 may include one or more gate driving integrated circuits GDIC.

The gate driving circuit 120 may be connected with the display panel 110 by TAB method or connected to a bonding pad of the display panel 110 by a COG or COP method or may be connected with the display panel 110 according to a COF method. Alternatively, the gate driving circuit 120 may be formed, in a gate in panel (GIP) type, in the non-display area NDA of the display panel 110.

The gate driving circuit 120 may be disposed on the substrate SUB or may be connected to the substrate SUB. For example, the gate driving circuit 120 that is of a GIP type may be disposed in the non-display area NDA of the substrate. For example, the gate driving circuit 120 that is of a gate in panel (GIP) type may be disposed on the left and/or right side of the display panel 110. The gate driving circuit 120 that is of a chip-on-glass (COG) type or chip-on-film (COF) type may be connected to the substrate.

At least one of the data driving circuit 130 and the gate driving circuit 120 may be disposed in the display area DA. For example, at least one of the data driving circuit 130 and the gate driving circuit 120 may be disposed not to overlap the subpixels SP or to overlap all or some of the subpixels SP.

The data driving circuit 130 may be connected to one side (e.g., an upper or lower side) of the display panel 110. Depending on the driving scheme or the panel design scheme, the data driving circuit 130 may be connected with both sides (e.g., upper and lower sides) of the self-emission display panel 110, or two or more of the four sides of the self-emission display panel 110.

The gate driving circuit 120 may be connected with one side (e.g., a left or right side) of the display panel 110. Depending on the driving scheme or the panel design scheme, the gate driving circuit 120 may be connected with both sides (e.g., left and right sides) of the display panel 110, or two or more of the four sides of the display panel 110.

The timing controller 140 may be implemented as a separate component from the data driving circuit 130, or the timing controller 140 and the data driving circuit 130 may be integrated into an integrated circuit (IC). The timing controller 140 may be a controller used in display technology or a control device that may perform other control functions as well as the functions of the timing controller, or a circuit in the control device. The timing controller 140 may be implemented as various circuits or electronic components, such as an integrated circuit (IC), a field programmable gate array (FPGA), an application specific integrated circuit (ASIC), or a processor.

The timing controller 140 may be mounted on a printed circuit board or a flexible printed circuit and may be electrically connected with the data driving circuit 130 and the gate driving circuit 120 through the printed circuit board or the flexible printed circuit. The timing controller 140 may transmit/receive signals to/from the data driving circuit 130 according to one or more predetermined interfaces. The interface may include, e.g., a low voltage differential signaling (LVDS) interface, an EPI interface, and a serial peripheral interface (SP), but embodiments of the disclosure are not limited thereto.

The display device 100 according to embodiments of the disclosure may be a self-emissive display device in which the display panel 110 emits light by itself. When the display device 100 according to the embodiments of the disclosure is a self-emissive display device, each of the plurality of subpixels SP may include a light emitting element. For example, the display device 100 according to embodiments of the disclosure may be an organic light emitting diode display in which the light emitting element is implemented as an organic light emitting diode (OLED). As another example, the display device 100 according to embodiments of the disclosure may be an inorganic light emitting display device in which the light emitting element is implemented as an inorganic material-based light emitting diode. As another example, the display device 100 according to embodiments of the disclosure may be a quantum dot display device in which the light emitting element is implemented as a quantum dot which is self-emission semiconductor crystal.

When a silicon substrate (SUB) is used in the display panel 110 constituting the display device 100, the temperature of the display panel 110 exhibits substantially the same distribution over the entire area due to the high thermal conductivity of silicon itself.

Accordingly, the display device 100 of the disclosure may simplify the structure of the display panel 110 by disposing a subpixel group for detecting characteristic values of the driving transistor only in a predetermined area on the silicon substrate SUB.

Figure 3:
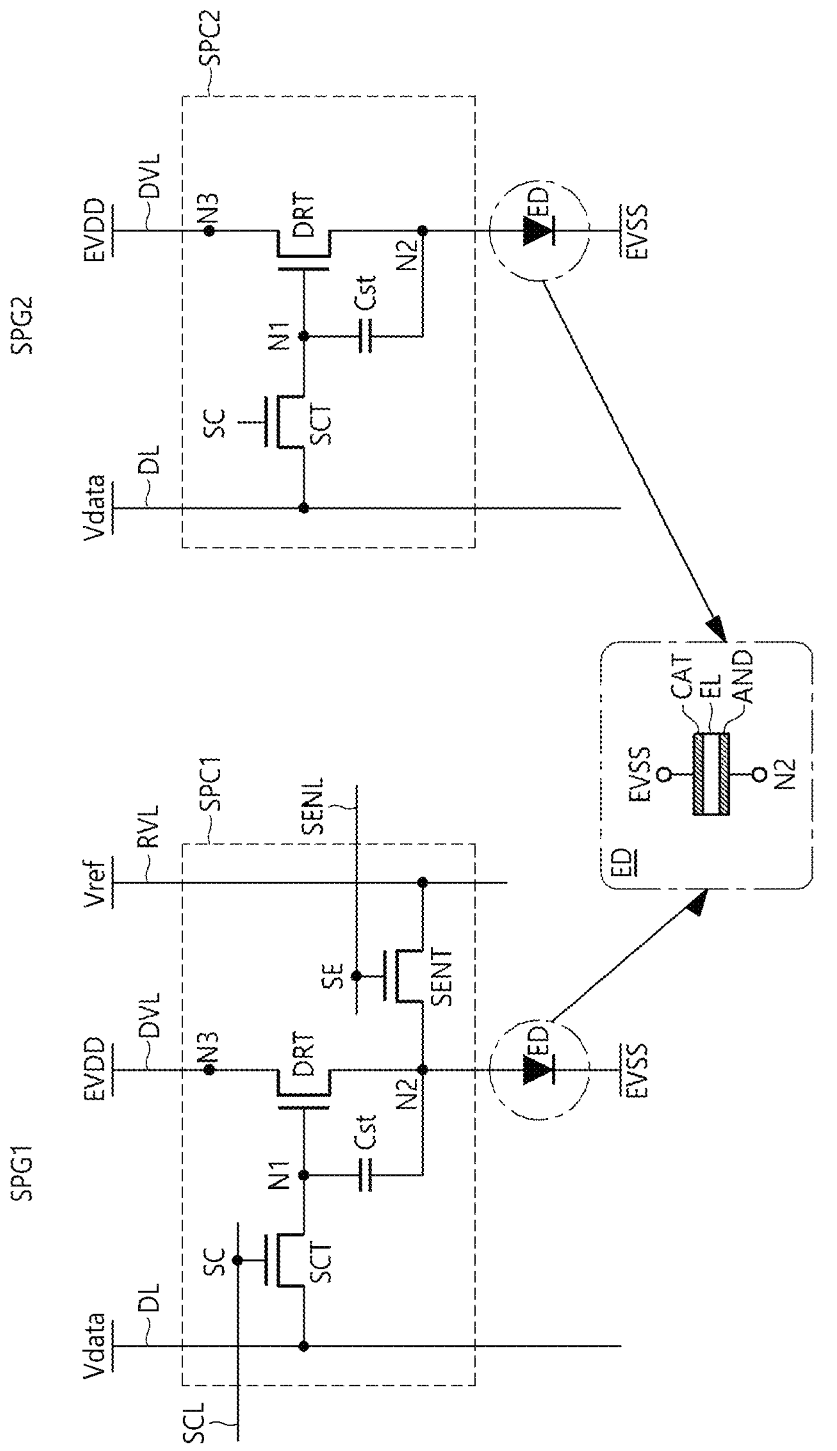
FIG. 3 is a view illustrating an example of an equivalent circuit of a first subpixel group for detecting a characteristic value of a driving transistor and a second subpixel group in a display panel according to embodiments of the disclosure.

FIG. 3 is a view illustrating an example of an equivalent circuit of a first subpixel group for detecting a characteristic value of a driving transistor and a second subpixel group in a display panel according to embodiments of the disclosure.

Referring to FIG. 3, the display panel 110 according to embodiments of the disclosure may include a first subpixel group SPG1 for detecting the characteristic value of the driving transistor DRT and a second subpixel group SPG2 that does not detect the characteristic value of the driving transistor DRT.

The first subpixel group SPG1 may include a first light emitting element ED and a first subpixel circuit SPC1 for driving the first light emitting element ED.

The first subpixel circuit SPC1 may include a driving transistor DRT, a scan transistor SCT, a sensing transistor SENT, and a storage capacitor Cst. In this case, as the first subpixel circuit SPC1 includes three transistors DRT, SCT, and SENT, and one capacitor Cst, it may be referred to as having a 3T (transistor) 1C (capacitor) structure.

The light emitting element ED may include an anode electrode AND and a cathode electrode CAT and may include a light emitting layer EL positioned between the anode electrode AND and the cathode electrode CAT.

The driving transistor DRT is a transistor for driving the light emitting element ED, and may include a first node N1, a second node N2, and a third node N3.

The first node N1 of the driving transistor DRT may be a gate node of the driving transistor DRT and may be electrically connected with a source node or a drain node of the scan transistor SCT. The second node N2 of the driving transistor DRT may be a source node or a drain node of the driving transistor DRT, and may be electrically connected with a source node or a drain node of the sensing transistor SENT and may also be electrically connected with the anode electrode AND of the light emitting element ED. The third node N3 of the driving transistor DRT may be electrically connected with a driving voltage line DVL supplying a pixel high-potential voltage EVDD.

The scan transistor SCT may be controlled by a scan signal SC, which is a type of gate signal, and may be connected between the first node N1 of the driving transistor DRT and the data line DL. In other words, the scan transistor SCT may be turned on or off according to the scan signal SC supplied from the scan signal line SCL, which is a type of the gate line GL, controlling the connection between the data line DL and the first node N1 of the driving transistor DRT.

The scan transistor SCT may be turned on by the scan signal SC having a turn-on level voltage and transfer the data voltage Vdata supplied from the data line DL to the first node N1 of the driving transistor DRT.

The sensing transistor SENT may be controlled by a sensing signal SE, which is a type of gate signal, and may be connected between the second node N2 of the driving transistor DRT and the reference voltage line RVL. In other words, the sensing transistor SENT may be turned on or off according to the sensing signal SE supplied from the sensing signal line, which is another type of the gate line GL, controlling the connection between the reference voltage line RVL and the second node N2 of the driving transistor DRT.

The sensing transistor SENT may be turned on by the sensing signal SE having a turn-on level voltage and transfer a reference voltage Vref supplied from the reference voltage line RVL to the second node N2 of the driving transistor DRT. Here, the sensing signal SE may be viewed as a second scan signal that is different from the scan signal SC.

The sensing transistor SENT may be turned on by the sensing signal SE having a turn-on level voltage, transferring the voltage of the second node N2 of the driving transistor DRT to the reference voltage line RVL.

The function in which the sensing transistor SENT transfers the voltage of the second node N2 of the driving transistor DRT to the reference voltage line RVL may be used for driving to sense the characteristic value of the driving transistor DRT. In this case, the voltage transferred to the reference voltage line RVL may be a voltage for calculating the characteristic value of the driving transistor DRT or a voltage reflecting the characteristic value of the driving transistor DRT.

For example, the characteristic value of the driving transistor DRT may include a threshold voltage and mobility of the driving transistor DRT.

The storage capacitor Cst may be electrically connected between the first node N1 and second node N2 of the driving transistor DRT. The storage capacitor Cst may be charged with the quantity of electric charge corresponding to the voltage difference between both ends thereof and may serve to maintain the voltage difference between both ends for a predetermined time. Accordingly, during the predetermined time, the corresponding subpixel SP may emit light.

Therefore, the display device 100 of the disclosure may sense the characteristic value of the driving transistor DRT through the voltage of the second node N2 transferred through the reference voltage line RVL for the subpixels SP constituting the first subpixel group SPG1.

In contrast, the second subpixel group SPG2 has a structure that does not sense the characteristic value of the driving transistor DRT. Accordingly, the second subpixel circuit SPC2 constituting the second subpixel group SPG2 may omit the sensing transistor SENT in the first subpixel circuit SPC1 constituting the first subpixel group SPG1.

Further, since the second subpixel group SPG2 does not sense the characteristic value of the driving transistor DRT, it may include the sensing transistor SENT, but may be formed so that the reference voltage line RVL does not extend to the second subpixel group SPG2. In the case, the subpixel circuit of the first subpixel group SPG1 and the subpixel circuit of the second subpixel group SPG2 may be configured in the same manner, and the reference voltage line RVL may be connected only to the first subpixel group SPG1 and may not be connected to the second subpixel group SPG2.

Accordingly, the second subpixel circuit SPC2 of the second subpixel group SPG2 may include a driving transistor DRT, a scan transistor SCT, and a storage capacitor Cst. In the case, since the second subpixel circuit SPC2 includes two transistors DRT and SCT and one capacitor Cst, it may be said that it has a 2T (transistor) 1C (capacitor) structure. Further, since the second subpixel group SPG2 does not sense the characteristic value of the driving transistor DRT, the reference voltage line RVL may extend to the first subpixel group SPG1 and may not extend to the second subpixel group SPG2.

Further, the first subpixel group SPG1 may be positioned in an area close to the data driving circuit 130 in the display panel 110, and the second subpixel group SPG2 may be positioned in an area farther from the data driving circuit 130 than the first subpixel group SPG1.

Figure 4:
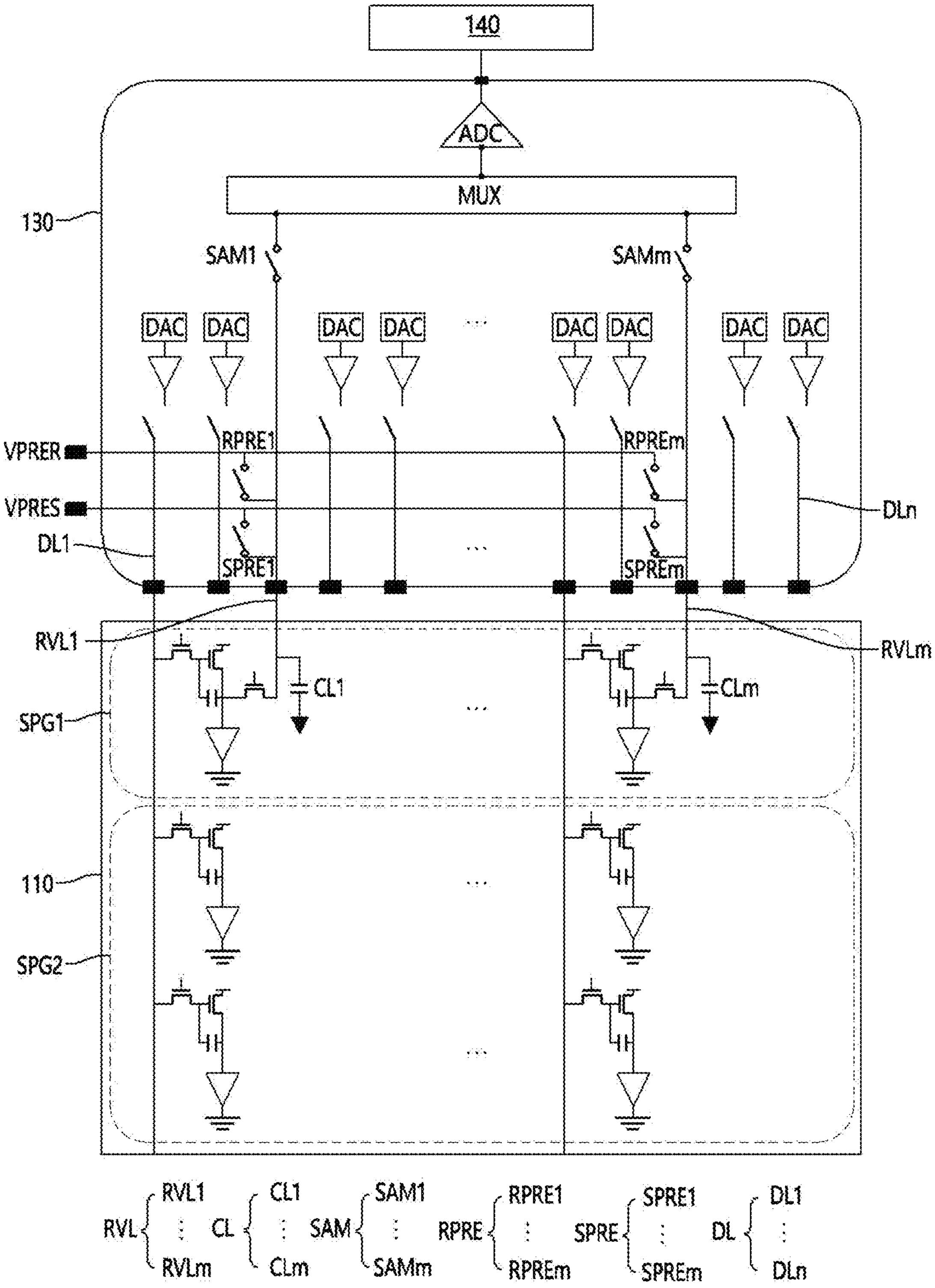
FIG. 4 is a view illustrating an example of a circuit structure for sensing a characteristic value of a driving transistor in a display device according to embodiments of the disclosure.

FIG. 4 is a view illustrating an example of a circuit structure for sensing a characteristic value of a driving transistor in a display device according to embodiments of the disclosure.

Referring to FIG. 4, in the display device 100 according to embodiments of the disclosure, the display panel 110 may include a first subpixel group SPG1 for sensing the characteristic value of the driving transistor DRT and a second subpixel group SPG2 for not sensing the characteristic value of the driving transistor DRT.

In the case, the first subpixel group SPG1 for sensing the characteristic value of the driving transistor DRT may include a subpixel line disposed in a direction where a gate signal is applied from a position closest to the data driving circuit 130. For example, in the display panel 110 on which the data driving circuit 130 is positioned, the first subpixel group SPG1 may include one subpixel line positioned at the uppermost portion of the display panel 110.

Alternatively, two or three subpixel lines positioned closest to the data driving circuit 130 in the display panel 110 may be formed as the first subpixel group SPG1.

Each subpixel constituting the first subpixel group SPG1 may include a sensing transistor SENT connected between the second node N2 of the driving transistor DRT and the reference voltage line RVL.

The display device 100 may include an analog-to-digital converter ADC that measures a voltage of the reference voltage line RVL corresponding to the voltage of the second node N2 of the driving transistor DRT and converts the voltage into a digital value, a sensing switch circuit for sensing a characteristic value, and a multiplexer MUX that selects a plurality of sensing voltages detected through the reference voltage line RVL.

The sensing switch circuit for sensing the characteristic value may include a sensing reference switch SPRE that controls a connection between the reference voltage line RVL and the sensing reference voltage supply node to which the reference voltage Vref is supplied. Further, the sensing switch circuit for sensing a characteristic value may include a sampling switch SAM1 to SAMm that controls the connection between the reference voltage lines RVL1 to RVLm and the analog-to-digital converter ADC. Here, the sensing reference switch SPRE is a switch that controls the sensing driving of the characteristic value, and the reference voltage Vref supplied to the reference voltage line RVL by the sensing reference switch SPRE becomes the sensing reference voltage VPRES.

Further, the sensing switch circuit for sensing the characteristic value of the driving transistor DRT may further include a display reference switch RPRE that controls display driving. The display reference switch RPRE may control the connection between the reference voltage line RVL and the display reference voltage supply node to which the reference voltage Vref is supplied. The display reference switch RPRE is a switch used for display driving, and the reference voltage Vref supplied to the reference voltage line RVL by the display reference switch RPRE corresponds to the display reference voltage VPRER.

In this case, the sensing reference switch SPRE and the display reference switch RPRE may be separately provided or may be integrated into one. The sensing reference voltage VPRES and the display reference voltage VPRER may have the same voltage value or different voltage values.

The timing controller 140 of the display device 100 may include a memory for storing the data transferred from the analog-to-digital converter ADC or previously storing a reference value and a compensation circuit that compares the reference value stored in the memory and the received data and compensates for the deviation in characteristic value.

Accordingly, the timing controller 140 may compensate for the image data DATA to be supplied to the data driving circuit 130 using the compensation value calculated by the compensation circuit. Accordingly, the data driving circuit 130 may convert the compensation image data into an analog signal type of compensation data voltage through a digital-to-analog converter DAC and output the compensation data voltage to the data line DL through an output buffer. As a result, the characteristic value deviation for the driving transistor DRT in the subpixel SP may be compensated.

As described above, the period for sensing the characteristic value of the driving transistor DRT may be performed after the power-on signal is generated and before display driving starts. For example, if a power-on signal is applied to the display device 100, the timing controller 140 loads parameters necessary for driving the display panel 110 and then drives the display. In this case, the parameters necessary for driving the display panel 110 may include information about the sensing and compensation for characteristic values previously performed on the display panel 110. In the parameter loading process, the sensing of characteristic values (threshold voltage and mobility) of the driving transistor DRT may be performed. As described above, a process in which the characteristic value is sensed after the power-on signal is generated and before the subpixel emits light is referred to as an on-sensing process.

Alternatively, a period in which the characteristic value of the driving transistor DRT is sensed may proceed after a power-off signal of the display device 100 is generated. For example, when a power-off signal is generated in the display device 100, the timing controller 140 may cut off the data voltage supplied to the display panel 110 and may sense the characteristic value of the driving transistor DRT for a predetermined time. As such, a process in which sensing of the characteristic value is performed in a state in which the data voltage is cut off as a power-off signal is generated so that emission of the subpixel is terminated is referred to as an off-sensing process.

Further, the sensing period for the characteristic value of the driving transistor DRT may be performed in real time while the display is driven. This sensing process is referred to as a real-time (RT) sensing process. In the real-time sensing process, the sensing process may be performed on one or more subpixels SP in one or more subpixel SP lines, each blank period during the display driving period.

In other words, during the display driving period when an image is displayed on the display panel 110, a blank period in which the data voltage is not supplied to the subpixel SP exists within one frame or between the nth frame and the nth frame and, in the blank period, mobility sensing for one or more subpixels SP may be performed.

Since the display device 100 of the disclosure forms a structure capable of sensing the characteristic value of the driving transistor DRT only in the first subpixel group SPG1 in the display panel 110, the structure of the display panel 110 may be simplified.

Further, since the display device 100 of the disclosure performs the sensing process only on the first subpixel group SPG1, which includes a structure capable of sensing the characteristic value of the driving transistor DRT, it is possible to reduce sensing time and easily sense the characteristic value of the driving transistor DRT in the blank interval during which the display is driven.

Meanwhile, the display device 100 of the disclosure may selectively sense a partial area of the display panel 110 so as to efficiently sense the characteristic value of the driving transistor DRT in the blank interval.

Figure 5:
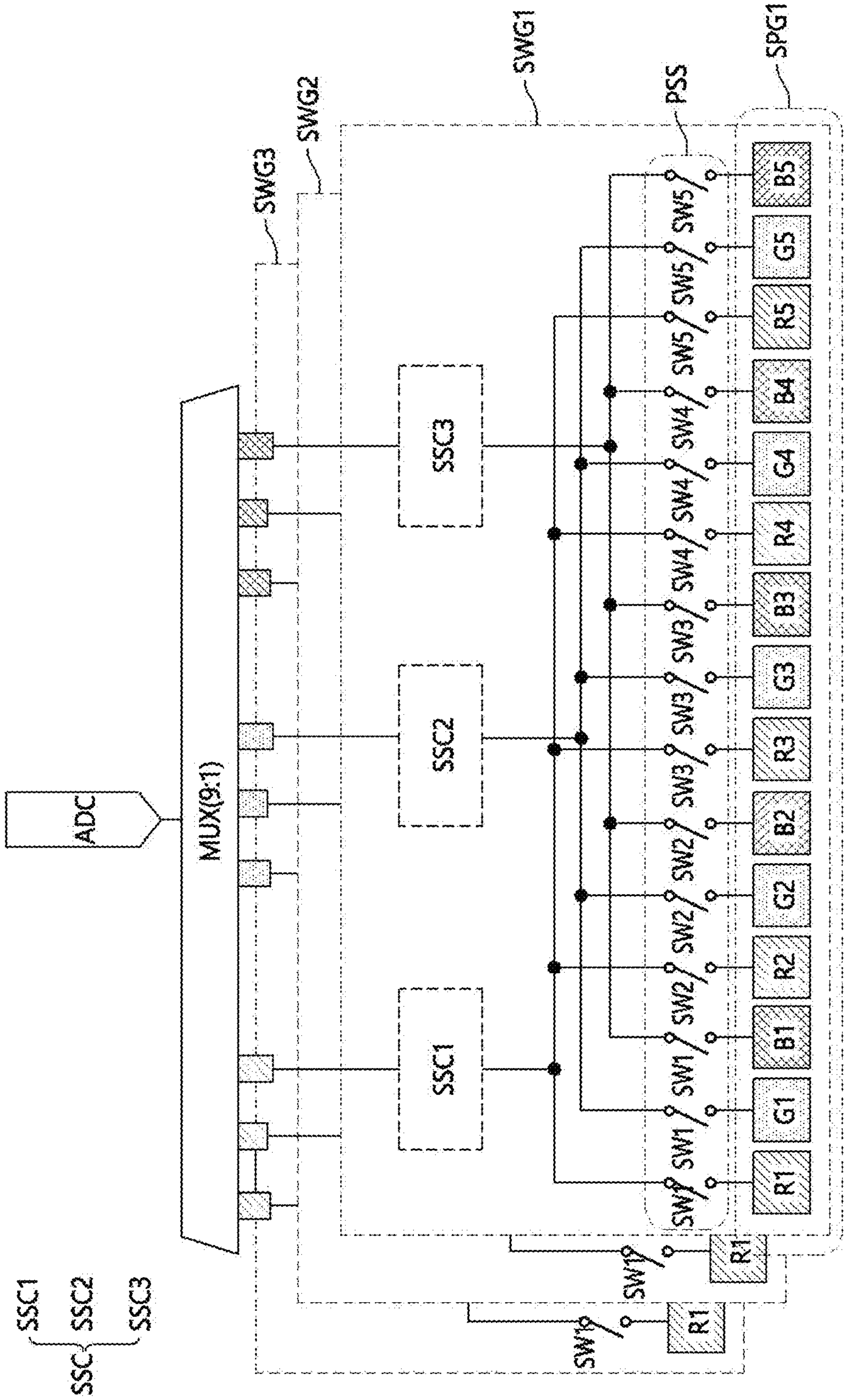
FIG. 5 is a view illustrating an example of a structure capable of selectively sensing a characteristic value of a driving transistor for a subpixel in a partial area in a display device according to embodiments of the disclosure.

FIG. 5 is a view illustrating an example of a structure capable of selectively sensing a characteristic value of a driving transistor for a subpixel in a partial area in a display device according to embodiments of the disclosure.

Referring to FIG. 5, in the display device 100 according to embodiments of the disclosure, a sensing switch circuit SSC (e.g., SSC1, SSC2, and SSC3) may be connected to a plurality of subpixels, targeting the first subpixel group SPG1 formed to sense the characteristic value of the driving transistor DRT.

The sensing switch circuit SSC may be connected to the plurality of subpixels through the pixel selection switch PSS. In this case, one sensing switch circuit SSC may be connected to subpixels of the same color.

The pixel selection switch PSS may be operated in pixel units including a red subpixel, a green subpixel, and a blue subpixel.

Therefore, the first sensing switch circuit SSC1 may be connected to the first red subpixel R1 to fifth red subpixel R5 through the pixel selection switch PSS. Accordingly, the display device 100 of the disclosure may sense the characteristic value of a red subpixel selected by the pixel selection switch PSS from among the first red subpixel R1 to fifth red subpixel R5.

Further, the second sensing switch circuit SSC2 may be connected to the first green subpixel G1 to fifth green subpixel G5 through the pixel selection switch PSS. Accordingly, the display device 100 of the disclosure may sense the characteristic value of the green subpixel selected by the pixel selection switch PSS from among the first green subpixel G1 to fifth green subpixel G5.

Further, the third sensing switch circuit SSC3 may be connected to the first blue subpixel B1 to fifth blue subpixel B5 through the pixel selection switch PSS. Accordingly, the display device 100 of the disclosure may sense the characteristic value of the blue subpixel selected by the pixel selection switch PSS from among the first blue subpixel B1 to fifth blue subpixel B5.

In this case, the subpixel selected to sense the characteristic value of the driving transistor DRT through the sensing switch circuit SSC may be the subpixel with the largest deterioration data capable of determining the deterioration state.

For example, deterioration data capable of determining a deterioration state of a subpixel may be a cumulative data voltage applied to each subpixel. In other words, it may be determined that the subpixel with the largest cumulative data voltage has deteriorated more than the subpixel with a lower cumulative data voltage because it has emitted light with high luminance for a long time.

On the other hand, when the first subpixel group SPG1 includes two or more subpixel lines, the cumulative data voltage may be calculated in units of data lines, and the characteristic value of the driving transistor may be sensed by selecting the data line with the largest cumulative data voltage.

The display device 100 according to embodiments of the disclosure may perform sensing driving in two sensing modes (a first sensing mode and a second sensing mode) for a subpixel selected from the first subpixel group SPG1 of the display panel 110.

Figure 6:
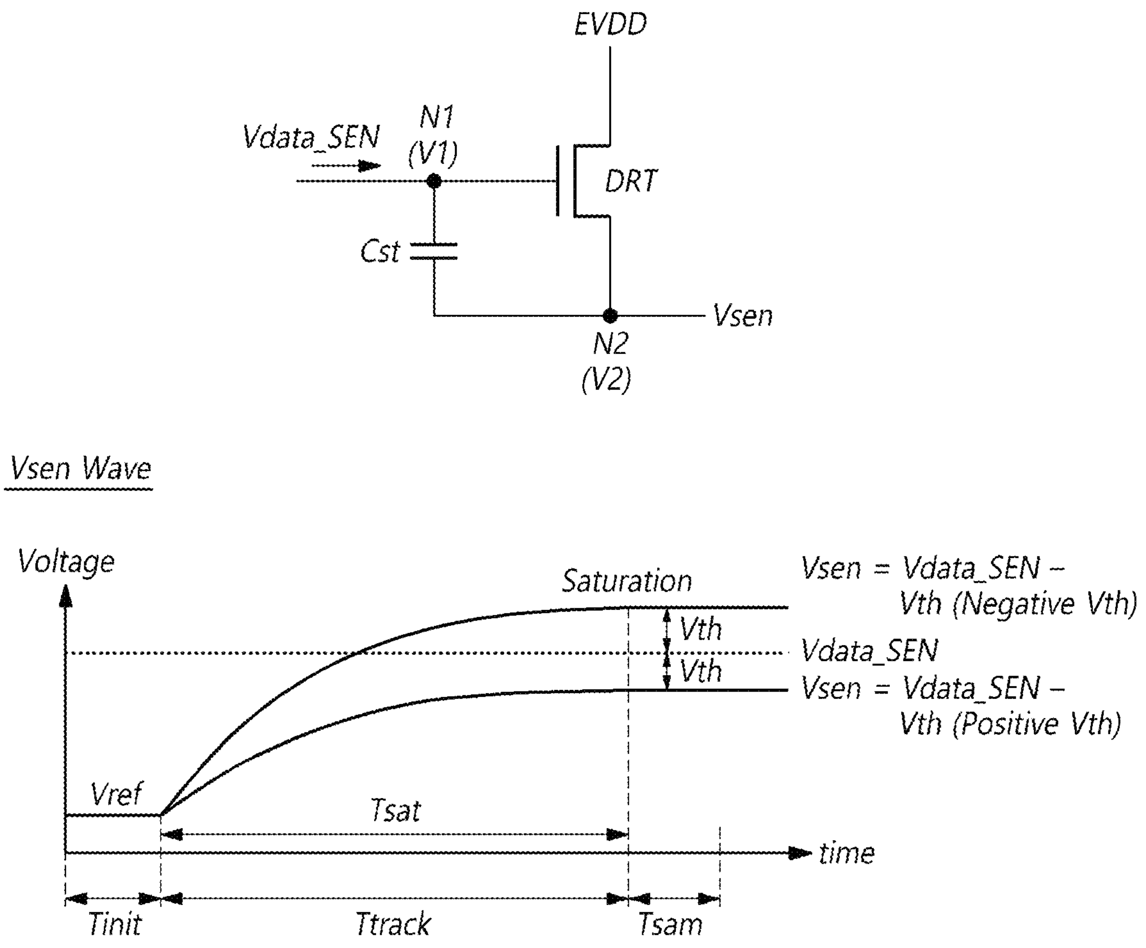
FIG. 6 is a diagram illustrating a first sensing mode of a display device according to embodiments of the disclosure.
Figure 7:
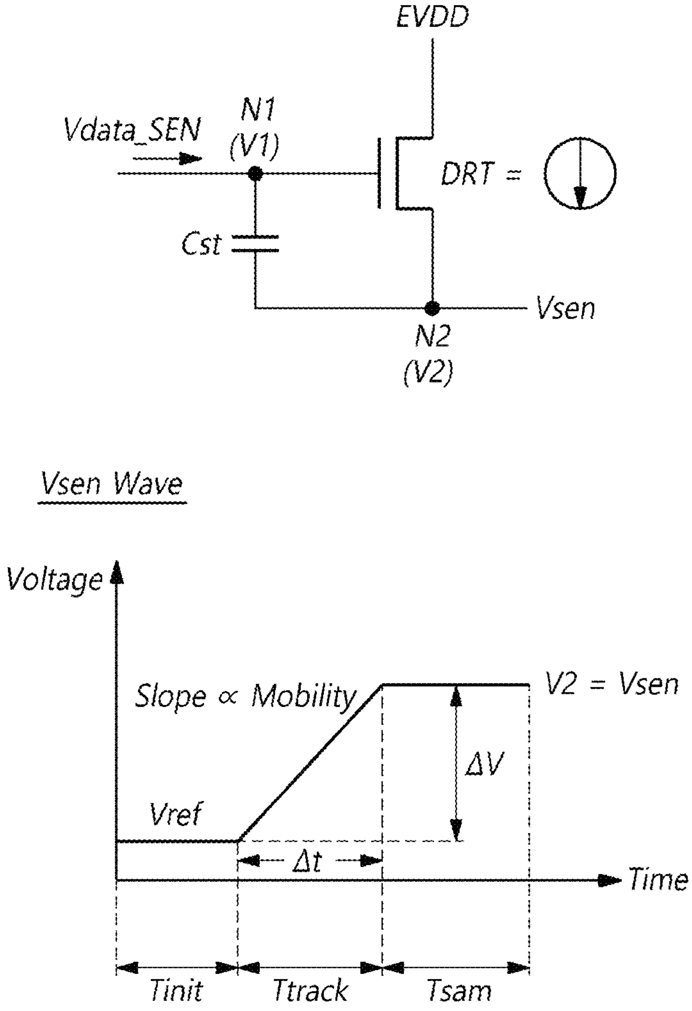
FIG. 7 is a diagram illustrating a second sensing mode of a display device according to embodiments of the disclosure.

FIG. 6 is a view illustrating a first sensing mode of a display device according to embodiments of the disclosure. FIG. 7 is a view illustrating a second sensing mode of a display device according to embodiments of the disclosure.

Referring to FIG. 6, "first sensing mode" is a sensing mode for sensing the threshold voltage requiring a relatively long sensing time among the characteristic values (e.g., threshold voltage and mobility) of the driving transistor DRT. The first sensing mode may also be referred to as a "slow sensing mode" or a "threshold voltage sensing mode".

Referring to FIG. 7, "second sensing mode" is a sensing mode for sensing the mobility requiring a relatively short sensing time among the characteristic values (e.g., threshold voltage and mobility) of the driving transistor DRT. The second sensing mode may also be referred to as a "fast sensing mode" or a "mobility sensing mode".

Referring to FIG. 6, the sensing driving period in the first sensing mode may include an initialization period Tinit, a tracking period Ttrack, and a sampling period Tsam.

The initialization period Tinit of the sensing driving period of the first sensing mode is a period for initializing the first node N1 and the second node N2 of the driving transistor DRT.

During the initialization period Tinit, the voltage V1 of the first node N1 of the driving transistor DRT may be initialized as a sensing data voltage Vdata_SEN, and the voltage V2 of the second node N2 of the driving transistor DRT may be initialized as a sensing reference voltage Vref.

During the initialization period Tinit, the scan transistor SCT and the sensing transistor SENT may be turned on, and the sensing reference switch SPRE may be turned on.

The tracking period Ttrack of the sensing driving period of the first sensing mode is a period for tracking the voltage V2 of the second node N2 of the driving transistor DRT reflecting the threshold voltage Vth of the driving transistor DRT or a change therein.

During the tracking period Ttrack, the sensing reference switch SPRE may be turned off, or the sensing transistor SENT may be turned off.

Accordingly, during the tracking period Ttrack, the first node N1 of the driving transistor DRT is in a constant voltage state of having the sensing data voltage Vdata_SEN, but the second node N2 of the driving transistor DRT may be in an electrically floating state. Accordingly, during the tracking period Ttrack, the voltage V2 of the second node N2 of the driving transistor DRT may be varied.

During the tracking period Ttrack, the voltage V2 of the second node N2 of the driving transistor DRT may increase until the voltage V2 of the second node N2 of the driving transistor DRT reflects the threshold voltage Vth of the driving transistor DRT.

During the initialization period Tinit, the voltage difference between the first node N1 and second node N2 of the initialized driving transistor DRT may be the threshold voltage Vth of the driving transistor DRT or more. Accordingly, when the tracking period Ttrack starts, the driving transistor DRT is in a turn-on state and conducts current. Accordingly, if the tracking period Ttrack starts, the voltage V2 of the second node N2 of the driving transistor DRT may increase.

During the tracking period Ttrack, the voltage V2 of the second node N2 of the driving transistor DRT does not steadily increase.

To the end of the tracking period Ttrack, the width at which the voltage of the second node N2 of the driving transistor DRT increase may be reduced and, resultantly, the voltage V2 of the second node N2 of the driving transistor DRT may be saturated.

The saturated voltage V2 of the second node N2 of the driving transistor DRT may correspond to the difference Vdata_SEN-Vth between the sensing data voltage Vdata_SEN and the threshold voltage Vth or the difference Vdata_SEN-ΔVth between the sensing data voltage Vdata_SEN and the threshold voltage deviation ΔVth. Here, the threshold voltage Vth may be a negative threshold voltage (Negative Vth) or a positive threshold voltage (Positive Vth).

If the voltage V2 of the second node N2 of the driving transistor DRT is saturated, the sampling period Tsam may be started.

The sampling period Tsam is a period for measuring the voltage (Vdata_SEN-Vth, Vdata_SEN-ΔVth) reflecting the threshold voltage Vth of the driving transistor DRT or a change therein.

The sampling period Tsam is a step in which the analog-to-digital converter ADC senses the voltage of the reference voltage line RVL. The voltage of the reference voltage line RVL may correspond to the voltage V2 of the second node N2 of the driving transistor DRT and correspond to the charged voltage of the line capacitor Crvl formed in the reference voltage line RVL.

During the sampling period Tsam, the sensing voltage Vsen sensed by the analog-to-digital converter ADC is the voltage Vdata_SEN-Vth which is the sensing data voltage Vdata_SEN minus the threshold voltage Vth or the voltage Vdata_SEN-ΔVth which is the sensing data voltage Vdata_SEN minus the threshold voltage deviation ΔVth. Here, the threshold voltage Vth may be a positive threshold voltage or a negative threshold voltage.

During the tracking period Ttrack of the sensing driving period of the first sensing mode, the saturation time Tsat taken for the voltage V2 of the second node N2 of the driving transistor DRT to be increased and saturated may be a temporal length of the tracking period Ttrack of the sensing driving period of the first sensing mode and may be a time taken for the threshold voltage Vth of the driving transistor DRT or a change therein to be reflected to the voltage V2 (V2=Vdata_SEN-Vth) of the second node N2 of the driving transistor DRT.

The saturation time Tsat may occupy most of the overall temporal length of the sensing driving period of the first sensing mode. In the first sensing mode, it may take a quite long time (saturation time: Tsat) for the voltage V2 of the second node N2 of the driving transistor DRT to be increased and saturated.

As described above, the sensing driving scheme for sensing the threshold voltage Vth of the driving transistor DRT requires a long saturation time Tsat until the voltage state of the second node N2 of the driving transistor DRT indicates the threshold voltage of the driving transistor DRT and may thus be referred to as a slow mode (first sensing mode).

Next, referring to FIG. 7, a sensing driving period in the second sensing mode is described.

Referring to FIG. 7, the sensing driving period in the second sensing mode may include an initialization period Tinit, a tracking period Ttrack, and a sampling period Tsam.

The initialization period Tinit of the sensing driving period of the second sensing mode is a period for initializing the first node N1 and the second node N2 of the driving transistor DRT.

The tracking period Ttrack is a period during which the voltage V2 of the second node N2 of the driving transistor DRT is changed during a preset tracking time Δt until the voltage V2 of the second node N2 of the driving transistor DRT becomes a voltage state of reflecting the mobility of the driving transistor DRT or a change in mobility.

During the tracking period Ttrack, the preset tracking time Δt may be set to be short. Accordingly, during the short tracking time Δt, it is hard for the voltage V2 of the second node N2 of the driving transistor DRT to reflect the threshold voltage Vth. However, during the short tracking time Δt, the voltage V2 of the second node N2 of the driving transistor DRT may be changed in such an extent as to be able to figure out the mobility of the driving transistor DRT.

Accordingly, the second sensing mode may be a sensing driving scheme for sensing the mobility of the driving transistor DRT.

In the tracking period Ttrack, as the sensing reference switch SPRE is turned off or the sensing transistor SENT is turned off, the second node N2 of the driving transistor DRT may become an electrically floating state.

During the tracking period Ttrack, by the scan signal SC of the turn-off level voltage, the scan transistor SCT may be in a turned-off state, and the first node N1 of the driving transistor DRT may be in a floating state.

If the first node N1 and second node N2 of the driving transistor DRT are the gate node and source node, respectively, the voltage difference between the first node N1 and second node N2 of the driving transistor DRT becomes Vgs.

Accordingly, during the tracking period Ttrack, the voltage V2 of the second node N2 of the driving transistor DRT may be increased. In this case, the voltage V1 of the first node N1 of the driving transistor DRT may also be increased.

During the tracking period Ttrack, the increasing rate of the voltage V2 of the second node N2 of the driving transistor DRT is varied depending on the current capability (i.e., mobility) of the driving transistor DRT. As the current capability (mobility) of the driving transistor DRT increases, the voltage V2 of the second node N2 of the driving transistor DRT may be further sharply increased.

After the tracking period Ttrack proceeds the preset tracking time Δt, i.e., after the voltage V2 of the second node N2 of the driving transistor DRT rises during the preset tracking time Δt, the sampling period Tsam may proceed.

During the tracking period Ttrack, the increasing rate of the voltage V2 of the second node N2 of the driving transistor DRT corresponds to the voltage variation ΔV of the second node N2 of the driving transistor DRT during the preset tracking time Δt. The voltage variation Δt of the second node N2 of the driving transistor DRT may correspond to the voltage variation of the reference voltage line RVL.

After the tracking period Ttrack proceeds the preset tracking time Δt, the sampling period Tsam may begin. During the sampling period Tsam, the sampling switch SAM may be turned on, so that the reference voltage line RVL and the analog-to-digital converter ADC may be electrically connected with each other.

The analog-to-digital converter ADC may sense the voltage of the reference voltage line RVL. The sensing voltage Vsen of the analog-to-digital converter ADC may be the voltage Vref+ΔV which is the reference voltage Vref plus an increment during the preset tracking time Δt, i.e., the voltage variation Δt.

The sensed voltage Vsen of the analog-to-digital converter ADC may be the voltage of the reference voltage line RVL and may be the voltage of the second node N2 electrically connected with the reference voltage line RVL through the sensing transistor SENT.

In the sampling period Tsam of the sensing driving period of the second sensing mode, the sensing voltage Vsen of the analog-to-digital converter ADC may be varied depending on the mobility of the driving transistor DRT. As the mobility of the driving transistor DRT increases, the sensing voltage Vsen increases. As the mobility of the driving transistor DRT decreases, the sensing voltage Vsen decreases.

As described above, the sensing driving scheme for sensing the mobility of the driving transistor DRT may change the voltage of the second node N2 of the driving transistor DRT only for a short time Δt and may thus be called a fast mode (second sensing mode).

The timing controller 140 may change the data based on the threshold voltage compensation value Φ and the mobility compensation value α stored in the memory, and supply the changed data (Data'=α×Data+Φ) to the data driving circuit 130.

The data driving circuit 130 may convert the data (Data'=α×Data+Φ) supplied from the timing controller 140 into the data voltage Vdata and supply the converted data to the corresponding sub-pixel SP. Here, the data voltage Vdata supplied to the corresponding subpixel SP may be a data voltage Vata capable of reducing the threshold voltage deviation and the mobility deviation.

Since the display device 100 of the disclosure performs the sensing process only on the first subpixel group SPG1 including a structure capable of sensing the characteristic value of the driving transistor DRT, the characteristic value of the driving transistor DRT may be easily sensed in the blank interval by reducing the sensing time for the characteristic value of the driving transistor DRT.

Meanwhile, the brightness of the subpixel SP constituting the display device 100 is proportional to the light emission current flowing through the light emitting element ED, and the light emission current is greatly affected by the threshold voltage of the driving transistor DRT.

In this case, when the driving transistor DRT is formed on a silicon wafer, the deterioration of the driving transistor DRT may be significant due to the high thermal conductivity of silicon (Si) itself.

In particular, in the case of an n-type driving transistor DRT, the light emission current caused by the deterioration of the driving transistor DRT may be further decreased by the body effect.

Figure 8:
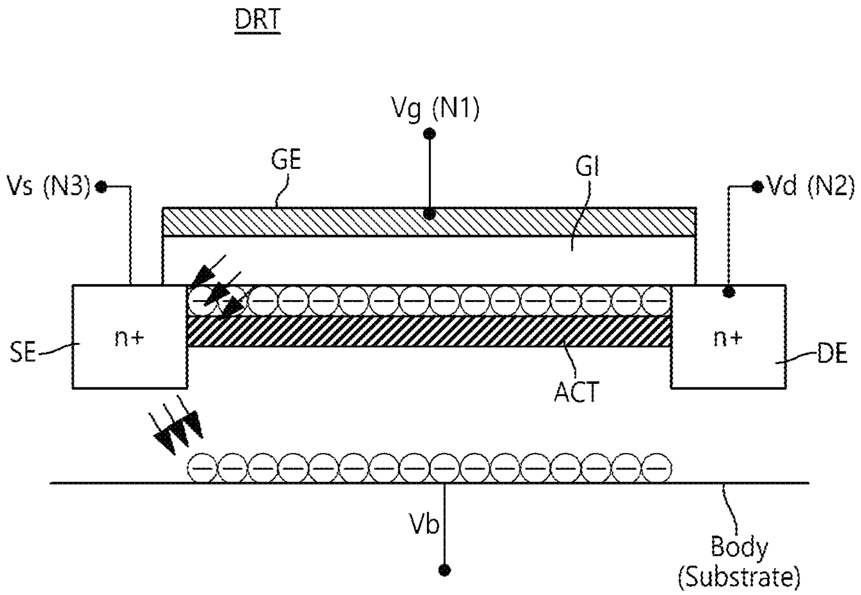
FIG. 8 is a view schematically illustrating a movement of electrons and holes in a driving transistor by a bias voltage in a display device according to embodiments of the disclosure.
Figure 9:
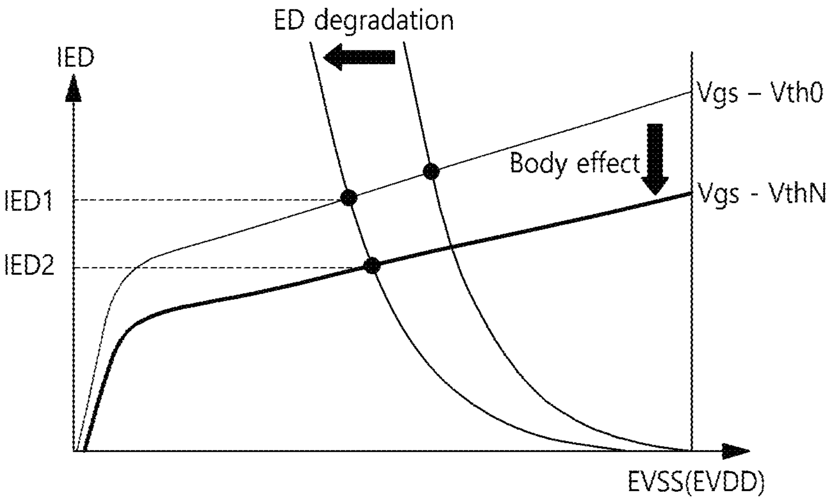
FIG. 9 is a graph illustrating a change in a light emission current flowing through a light emitting element according to a driving voltage in a display device according to embodiments of the disclosure.

FIG. 8 is a view schematically illustrating a movement of electrons and holes in a driving transistor by a bias voltage in a display device according to embodiments of the disclosure. FIG. 9 is a graph illustrating a change in a light emission current flowing through a light emitting element according to a driving voltage in a display device according to embodiments of the disclosure.

First, referring to FIG. 8, in the display device 100 according to embodiments of the disclosure, the transistor constituting the subpixel SP may have an active layer ACT of a semiconductor material between the source electrode SE and the drain electrode DE on the substrate, and a gate insulation film GI, and a gate electrode GE formed on the gate insulation film GI.

In this case, since the gate insulation film GI has low thermal conductivity, it may be difficult for heat to escape through the separation space between the active layer ACT and the gate electrode GE.

In this state, when the gate voltage Vg is applied to the gate electrode GE and the drain voltage Vd is applied to the drain electrode DE, a channel area is formed in the active layer ACT between the drain electrode DE and the source electrode SE.

In the channel area, holes and electrons of the source electrode SE and the drain electrode DE are exchanged. In other words, electrons move from the source electrode SE to the drain electrode DE, and holes move from the drain electrode DE to the source electrode SE.

In this case, electrons are accelerated by applying the bias voltages Vg and Vd, and a drain avalanche occurs in which a large amount of electrons and holes are generated in the drain electrode DE. As a result, the generated electrons exit to the drain electrode DE, and the holes exit to the source electrode SE again through the channel area.

However, the holes entering the source electrode SE through the channel area are moved to the lower portion of the active layer ACT by the gate voltage Vg applied to the gate electrode GEa. In this case, when some holes move through the active layer ACT to the source electrode SE, they remain trapped in the body (substrate) interface under the active layer ACT.

As such, the increase in the hole concentration in the source electrode SE causes an effect of lowering the barrier to be overcome when electrons move from the source electrode SE to the drain electrode DE through the active layer ACT. In other words, the threshold voltage of the transistor decreases a predetermined time after the gate voltage Vg is applied to the gate electrode GE and the drain voltage Vd is applied to the drain electrode DE.

As such, the phenomenon in which the concentration of the hole increases in the body (substrate) interface positioned under the active layer (ACT), lowering the source barrier and the threshold voltage of the transistor is called the floating body effect.

Referring to FIG. 9, since the driving transistor constituting the subpixel deteriorates (ED) as the driving time increases, the light emission current IED decreases due to the driving voltage (e.g., EVDD/EVSS).

At this time, when the threshold voltage of the driving transistor is lowered by the body effect, the amount of electrons contributing to the drain avalanche increases significantly, which in turn increases the hole current. As a result, the source barrier is further lowered, causing positive feedback of the driving transistor, further deteriorating the characteristics of the driving transistor and reducing the luminance of the display panel 110.

For example, as the driving transistor's threshold voltage is decreased by the body effect (e.g., Vth0->VthN), the light emission current IED flowing through the light emitting element ED is decreased by the difference between the gate-source voltage Vgs and the threshold voltage.

In other words, the second light emission current IED2 is lower than the expected first light emission current (e.g., IED1) due to the deterioration of the light emitting element ED flows through the light emitting element ED, further reducing the luminance of the display panel 110.

The deterioration of element characteristics due to the body effect is further increased in the case of an element formed of a short channel, and the effect may be increased in the case of a display panel 110 using a silicon substrate.

The display device 100 of the disclosure may additionally compensate for the deterioration state of the driving transistor DRT by detecting a change in the light emission current IED due to the body effect in the blank interval.

Figure 10:
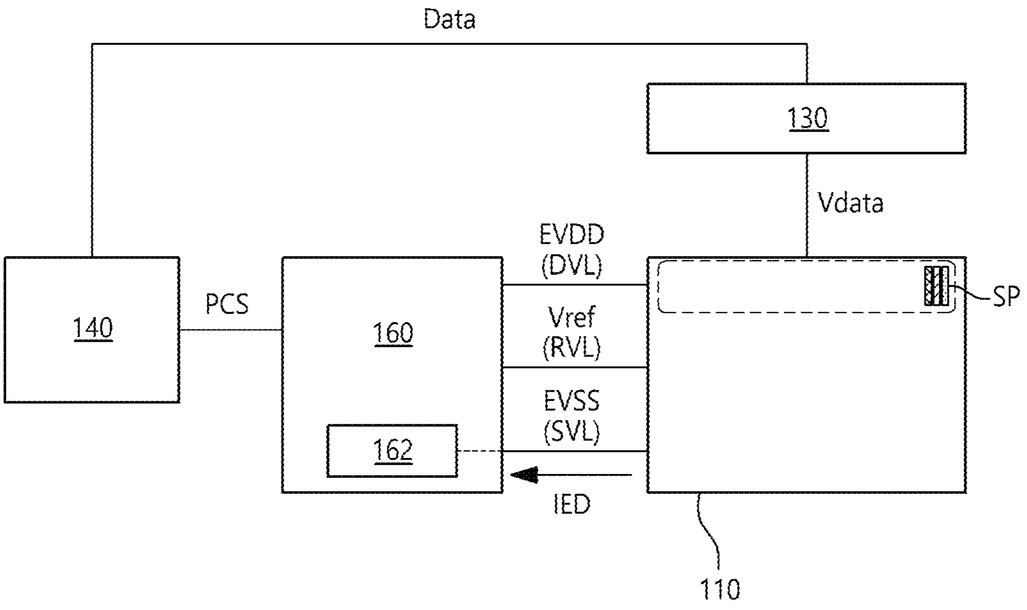
FIG. 10 is a block diagram schematically illustrating a display device according to embodiments of the disclosure.

FIG. 10 is a block diagram schematically illustrating a display device according to embodiments of the disclosure.

Referring to FIG. 10, a display device 100 according to embodiments of the disclosure may include at least one source printed circuit board SPCB for circuit connection between a plurality of source driving integrated circuits SDIC constituting a data driving circuit 130 and other devices and a control printed circuit board CPCB for mounting control components and various electric devices.

In this case, the source film where the source driving integrated circuit SDIC is mounted may be connected to at least one source printed circuit board SPCB. In other words, one side of the source film where the source driving integrated circuit SDIC is mounted may be electrically connected with the display panel 110, and the other side thereof may be electrically connected with the source printed circuit board SPCB.

The timing controller 140 and the power management circuit 160 may be mounted on the control printed circuit board CPCB. The power management circuit 160 may supply driving voltage or current to the display panel 110, the data driving circuit 130, and the gate driving circuit 120 and control the supplied voltage or current, by a power management signal PCS supplied from the timing controller 140.

The power management circuit 160 of the display device 100 of the disclosure may control the pixel high-potential voltage EVDD supplied to the display panel 110 through the pixel high-potential voltage line DVL, the pixel low-potential voltage EVSS supplied to the display panel 110 through the pixel low-potential voltage line SVL, and the reference voltage Vref supplied to the display panel 110 through the reference voltage line RVL under the control of the timing controller 140.

The display device 100 of the disclosure may detect the source node voltage of the driving transistor DRT through the reference voltage line RVL in a state in which the sensing transistor SENT included in the first subpixel group SPG1 is turned on. In this case, the reference voltage Vref may be applied through the reference voltage line RVL in order to detect the source node voltage of the driving transistor DRT.

In this case, the combination of the pixel high-potential voltage EVDD, the pixel low-potential voltage EVSS, and the reference voltage Vref may also be referred to as the pixel driving voltage.

The power management circuit 160 may include a light emission current sensor 162 that detects the light emission current IED flowing through the light emitting element ED through the pixel low-potential voltage line SVL. The light emission current sensor 162 may be positioned inside the power management circuit 160 or may be positioned on the control printed circuit board CPCB.

The timing controller 140 may control the pixel high-potential voltage EVDD, the reference voltage Vref, and the pixel low-potential voltage EVSS output from the power management circuit 160 to detect the light emission current IED flowing through the pixel low-potential voltage line SVL. Further, the timing controller 140 may control the image data Data supplied to the data driving circuit 130 to detect the light emission current IED flowing through the pixel low-potential voltage line SVL.

In this case, the light emission current IED flowing through the pixel low-potential voltage line SVL may be detected in a power-on interval during which power is applied to the display device 100, a power-off interval during which the power of the display device 100 is cut off, or a blank interval in the display driving period when the display panel 110 is driven.

The timing controller 140 may change the pixel high-potential voltage EVDD or the pixel low-potential voltage EVSS applied to the display panel 110 during the display driving period using the light emission current IED detected in the power management circuit 160.

Figure 11:
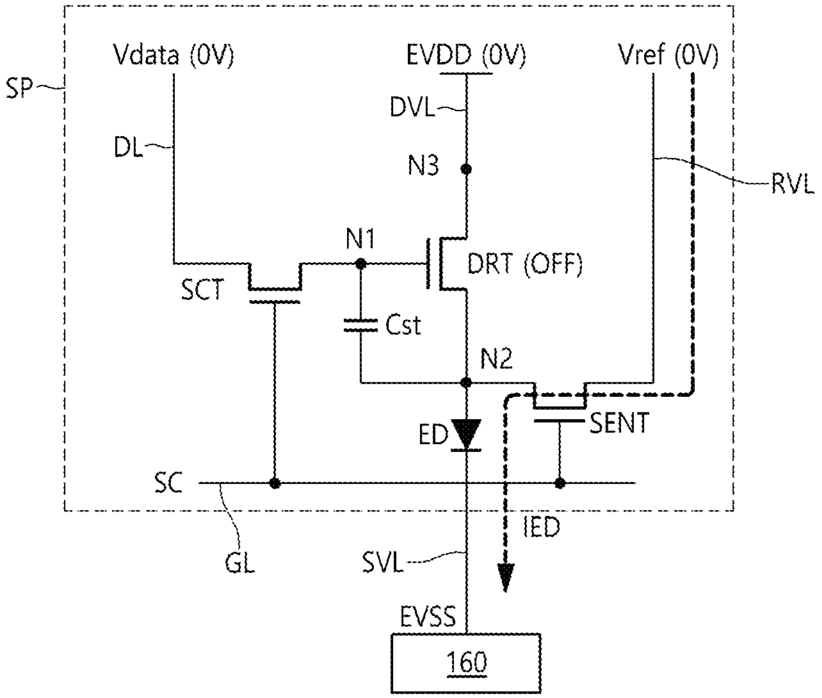
FIG. 11 is a view illustrating an example of an operation of detecting a light emission current flowing through a light emitting element in a display device according to embodiments of the disclosure.

FIG. 11 is a view illustrating an example of an operation of detecting a light emission current flowing through a light emitting element in a display device according to embodiments of the disclosure.

Referring to FIG. 11, in the display device 100 according to embodiments of the disclosure, the subpixel SP included in the first subpixel group SPG1 may include a light emitting element ED, a driving transistor DRT, a scan transistor SCT, a sensing transistor SENT, and a storage capacitor Cst.

In this case, the display device 100 of the disclosure may detect a change in the light emission current IED by varying the pixel low-potential voltage EVSS applied to the cathode electrode of the light emitting element ED through the pixel low-potential voltage line SVL in a state in which the data voltage Vdata, the pixel high-potential voltage EVDD, and the reference voltage Vref are fixed.

For example, in the light emission current detection interval for detecting the light emission current IED, the display device 100 of the disclosure may fix the data voltage Vdata applied to the subpixel SP, the pixel high-potential voltage EVDD, and the reference voltage Vref to 0V.

Accordingly, the driving transistor DRT is maintained in a turn-off state in the light emission current detection interval.

In this state, when the pixel low-potential voltage EVSS applied to the cathode electrode of the light emitting element ED is varied among three or more levels, the power management circuit 160 may detect the light emission current IED flowing through the source node of the driving transistor DRT from the reference voltage line RVL, thereby determining the current-voltage characteristics of the driving transistor DRT. The deteriorated threshold voltage of the driving transistor DRT may be determined from the current-voltage characteristics of the driving transistor DRT.

In this case, the deviation between the reference voltage Vref and the pixel low-potential voltage EVSS may be varied in a range larger than the threshold voltage of the light emitting element ED so that the light emission current IED may flow through the light emitting element ED in the light emission current detection interval.

The pixel low-potential voltage line SVL connected to the cathode electrode of the light emitting element ED may be commonly connected to all of the subpixels SP constituting the display panel 110. In this case, the light emission current IED detected through the power management circuit 160 may correspond to the entire light emission current of the display panel 110.

As described above, since the light emission current IED has a non-linear relationship with the pixel high-potential voltage EVDD and the pixel low-potential voltage EVSS, three or more light emission currents IED may be detected by applying the pixel low-potential voltage EVSS of different levels three or more times in the light emission current detection interval to accurately detect the light emission current IED.

Specifically, since the current-voltage curve (I-V curve) of the light emitting element ED is non-linear, it is difficult to accurately determine the change in the curve by the pixel low-potential voltage (EVSS) with two different levels. Thus, it is possible to accurately detect the changed current-voltage curve (I-V curve) of the light emitting element ED using three or more light emission current EVSS values detected through the pixel low-potential voltage EVSS with three or more different levels in the light emission current detection interval.

For example, a first light emission current flowing through the pixel low-potential voltage line SVL may be detected by applying a first pixel low-potential voltage at a first time, a second light emission current flowing the pixel low-potential voltage line SVL may be detected by applying a second pixel low-potential voltage at a second time, and a third light emission current flowing through the pixel low-potential voltage line SVL may be detected by applying a third pixel low-potential voltage at a third time.

If the first to third light emission currents corresponding to the first pixel low-potential voltage to the third pixel low-potential voltage are connected, a changed current-voltage curve I-V curve of the light emitting element ED may be obtained.

Therefore, the timing controller 140 may correct the luminance deviation of the display panel 110 by calculating the maximum light emission current flowing through the light emitting element ED at the maximum grayscale based on the changed current-voltage curve I-V curve for the light emitting element ED and changing the pixel high-potential voltage EVDD or pixel low-potential voltage EVSS applied to the display panel 110.

Figure 12:
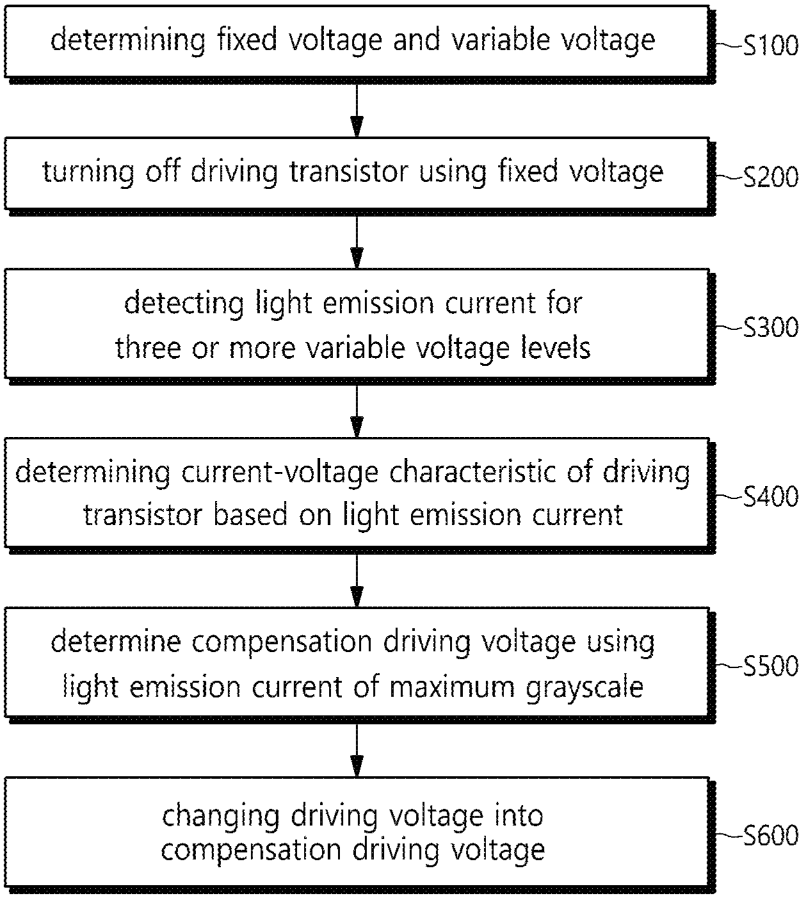
FIG. 12 is a flowchart illustrating a process of compensating for a characteristic value of a driving transistor by changing a pixel low-potential voltage in a display device according to embodiments of the disclosure.

FIG. 12 is a flowchart illustrating a process of compensating for a characteristic value of a driving transistor by changing a pixel low-potential voltage in a display device according to embodiments of the disclosure.

Referring to FIG. 12, a display driving method according to embodiments of the disclosure may include a step S100 of determining a fixed voltage and a variable voltage, a step S200 of turning off a driving transistor using the fixed voltage, a step S300 of detecting a light emission current for three or more variable voltage levels, a step S400 of determining a current-voltage characteristic of a driving transistor DRT based on the light emission current, a step S500 of determining a compensation driving voltage using a light emission current of a maximum grayscale, and a step S600 of changing the driving voltage into the compensation driving voltage.

The step S100 of determining the fixed voltage and the variable voltage is a process of setting a voltage applied to the subpixel SP in order to detect the light emission current IED flowing through the light emitting element ED.

For example, in order to detect the light emission current IED flowing through the light emitting element ED, the data voltage Vdata, the pixel high-potential voltage EVDD, and the reference voltage Vref applied to the subpixel SP may be set as the fixed voltage, and the pixel low-potential voltage EVSS may be set as the variable voltage.

Alternatively, the data voltage Vdata, the pixel high-potential voltage EVDD, and the pixel low-potential voltage EVSS applied to the subpixel SP may be set as the fixed voltage, and the reference voltage Vref may be set as the variable voltage.

The step S200 of turning off the driving transistor DRT using the fixed voltage is a process of turning off the driving transistor DRT through the fixed voltage in order to block the influence of the driving transistor DRT so as to detect the deterioration characteristics of the light emitting element ED.

For example, when the data voltage Vdata and the pixel high-potential voltage EVDD are fixed to 0 V in a state in which the scan transistor SCT is turned on, the driving transistor DRT may be turned off.

The step S300 of detecting the light emission current IED for three or more variable voltage levels is a process of detecting the light emission current IED flowing through the light emitting element ED while changing the level of the variable voltage three or more times in a state in which the driving transistor DRT is turned off.

Figure 13:
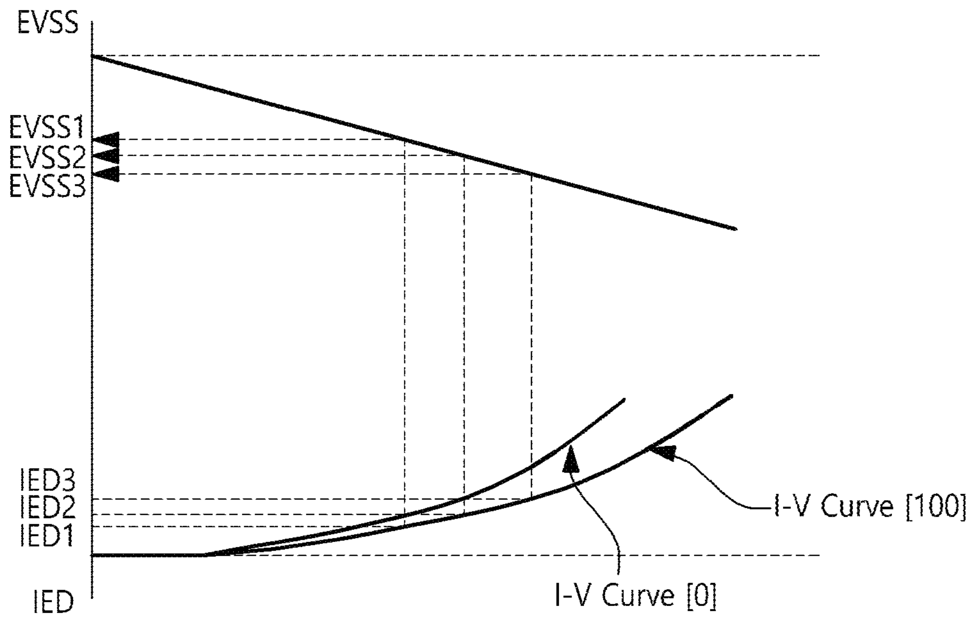
FIG. 13 is a signal graph illustrating a process of detecting a light emission current flowing through a light emitting element while changing the level of a variable voltage in a display driving method according to embodiments of the disclosure.
Figure 14:
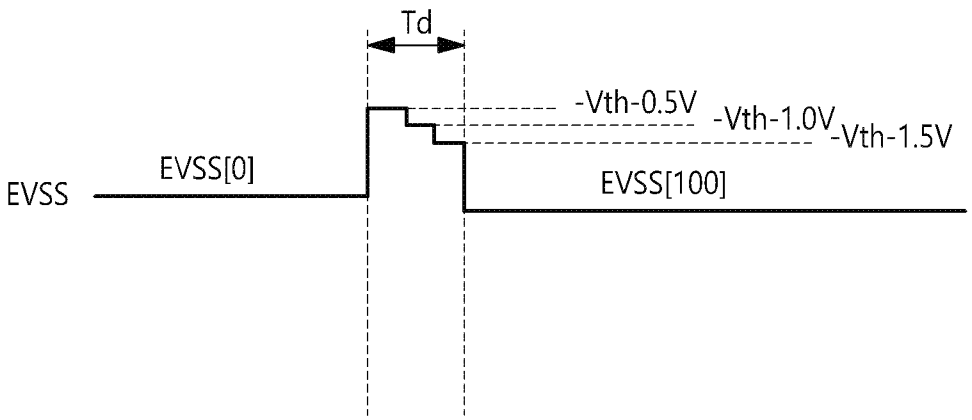
FIG. 14 is a view illustrating an example of a pixel low-potential voltage varied to detect a light emission current in a display driving method according to embodiments of the disclosure.

FIG. 13 is a signal graph illustrating a process of detecting a light emission current flowing through a light emitting element while changing the level of a variable voltage in a display driving method according to embodiments of the disclosure. FIG. 14 is a view illustrating an example of a pixel low-potential voltage varied to detect a light emission current in a display driving method according to embodiments of the disclosure.

Referring to FIGS. 13 and 14, the display device 100 according to embodiments of the disclosure may detect the light emission current IED flowing through the source node of the driving transistor DRT while changing the level of the pixel low-potential voltage EVSS three or more times in the light emission current detection interval Td in a state in which the driving transistor DRT is turned off.

In this case, the emission current detection interval Td may be included in the blank interval of the display driving period when an image is displayed on the display panel 110.

For example, while sequentially changing the pixel low-potential voltage EVSS into the first pixel low-potential voltage EVSS1 to the third pixel low-potential voltage EVSS3 in a state in which the reference voltage Vref is fixed at 0V, the light emission currents IED1, IED2, and IED3 flowing through the light emitting element ED may be detected in each case.

Here, the I-V Curve [0] denotes the initial current-voltage curve of the light emitting element ED, and the I-V Curve [100] denotes the current-voltage curve of the light emitting element ED detected through the display driving method of the disclosure after driving the display device 100 for 100 hours.

In this case, the display device 100 may store information about the initial current-voltage curve I-V Curve [0] of the light emitting element ED in a memory.

The display device 100 may extract the current-voltage curve I-V Curve [100] at a time when the light emitting element ED is driven for 100 hours by detecting the first light emission current IED1 when the first pixel low-potential voltage EVSS1 is applied to the low-potential voltage line SVL, the second light emission current IED2 when the second pixel low-potential voltage EVSS2 is applied, and the third light emission current IED3 when the third pixel low-potential voltage EVSS3 is applied.

In this case, the variable pixel low-potential voltage EVSS may be selected so that the deviation from the reference voltage Vref is larger than the threshold voltage of the light emitting element ED. Further, the first pixel low-potential voltage EVSS1, the second pixel low-potential voltage EVSS2, and the third pixel low-potential voltage EVSS3 for detecting the light emission current IED may be selected at the same interval (e.g., 0.5 V). For example, the first pixel low-potential voltage EVSS1 may be set to a voltage (−Vth-0.5V) which is 0.5 V lower than the threshold voltage of the light emitting element ED, the second pixel low-potential voltage EVSS2 may be set to a voltage (−Vth-1.0V) which is 1 V lower than the threshold voltage of the light emitting element ED, and the third pixel low-potential voltage EVSS3 may be set to a voltage (−Vth-1.5V) which is 1.5 V lower than the threshold voltage of the light emitting element ED. In this case, an initial value (e.g., EVSS[0]) of the pixel low-potential voltage EVSS may be set to a negative voltage (e.g., −5 V or less) by reflecting the type of the driving transistor DRT. In other words, the pixel low-potential voltage EVSS in the light emission current detection interval Td for sensing may have a value higher than the potential of the pixel low-potential voltage EVSS provided in the previous display period.

Here, for the pixel low-potential voltage EVSS, the initial pixel low-potential voltage EVSS[0] set by reflecting the initial current-voltage curve I-V Curve[0] of the light emitting element ED may differ from the compensation pixel low-potential voltage EVSS[100] set by reflecting the deteriorated current-voltage curve I-V Curve [100] after 100 hours of driving.

The step S400 of determining the current-voltage characteristic of the driving transistor DRT based on the light emission current IED is a process of determining the deterioration characteristic of the driving transistor DRT by determining the current-voltage curve I-V curve flowing through the source node of the driving transistor DRT using the light emission currents IED1, IED2, and IED3 corresponding to three or more different pixel low-potential voltages EVSS1, EVSS2, and EVSS3.

Figure 15:
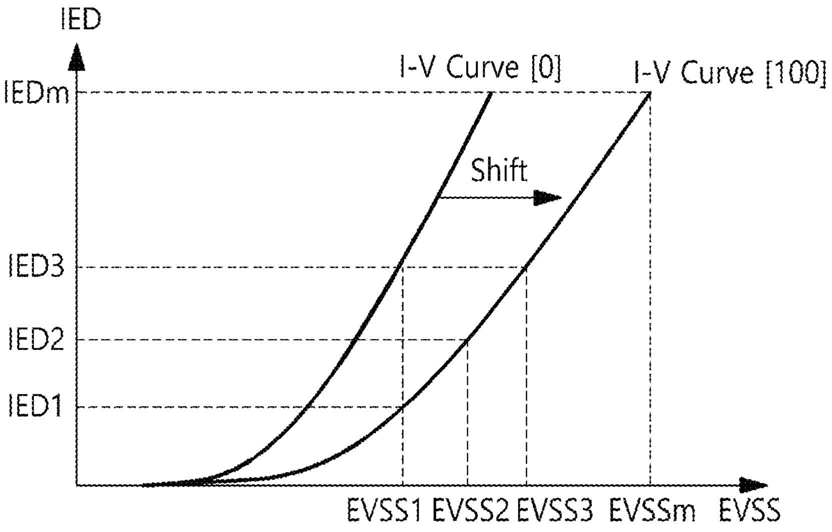
FIG. 15 is a graph illustrating an example of a process of determining a current-voltage characteristic of a driving transistor using a light emission current according to a variable pixel low-potential voltage in a display driving method according to embodiments of the disclosure.

FIG. 15 is a graph illustrating an example of a process of determining a current-voltage characteristic of a driving transistor using a light emission current according to a variable pixel low-potential voltage in a display driving method according to embodiments of the disclosure.

Referring to FIG. 15, the display device 100 of the disclosure may detect the light emission currents IED1, IED2, and IED3 flowing through the light emitting element ED while fixing the reference voltage Vref and changing the pixel low-potential voltage EVSS to the first pixel low-potential voltage EVSS1 to the third pixel low-potential voltage EVSS3 in a state in which the driving transistor DRT is turned off.

As described above, the first light emission current IED1 when the first pixel low-potential voltage EVSS1 is applied to the low-potential voltage line SVL, the second light emission current IED2 when the second pixel low-potential voltage EVSS2 is applied, and the third light emission current IED3 when the third pixel low-potential voltage EVSS3 is applied may be detected, and through this, the current-voltage curve I-V Curve [100] may be extracted when the light emitting element ED is driven for 100 hours.

As such, the characteristic value of the driving transistor DRT may be determined using the current-voltage curve (I-V Curve [100]) at the time when the driving transistor DRT is driven for 100 hours.

The step S500 of determining the compensation driving voltage using the light emission current IEDm of the maximum grayscale is a process of determining a compensation driving voltage at which the light emission current IEDm of the maximum grayscale (e.g., 255 grayscale) may flow from the current-voltage curve I-V Curve [100] of the detected driving transistor DRT.

When the pixel low-potential voltage EVSS is controlled to compensate for the deteriorated characteristic value of the driving transistor DRT, the maximum pixel low-potential voltage EVSSm corresponding to the emission current IEDm of the maximum grayscale in the current-voltage curve I-V Curve [100] of the driving transistor DRT may be included in the compensation driving voltage.

In an embodiment, the compensation driving voltage may be determined based on a deviation between the previously set initial pixel low-potential voltage EVSS[0] and the maximum pixel low-potential voltage EVSSm derived from the updated current-voltage curve I-V Curve [100] of the driving transistor DRT. For example, if the deviation between the initial pixel low-potential voltage EVSS[0] and the maximum pixel low-potential voltage EVSSm is smaller than a preset threshold, the pixel low-potential voltage EVSS may not be changed but may be maintained.

When the deviation between the initial pixel low-potential voltage EVSS[0] and the maximum pixel low-potential voltage EVSSm is larger than or equal to the threshold, the pixel low-potential voltage EVSS may be changed by a preset voltage value. For example, the pixel low-potential voltage EVSS may change the pixel low-potential voltage EVSS in a changeable resolution unit. (e.g., the threshold is set to 0.5V, and the pixel low-potential voltage EVSS is changed in units of 0.5 V)

The maximum pixel low-potential voltage EVSSm corresponding to the updated current-voltage curve I-V Curve [100] of the driving transistor DRT may be set to a reference value, and the maximum pixel low-potential voltage EVSSm may be compared with the maximum pixel low-potential voltage extracted in a subsequent light emission current detection interval. Whether the pixel low-potential voltage EVSS is changed and the level of a new pixel low-potential voltage EVSS may be determined based on the comparison result.

The step S600 of changing the driving voltage into the compensation driving voltage is a process of changing the driving voltage into a compensation driving voltage determined using the light emission current IEDm of the maximum grayscale.

In an embodiment, the data voltage (gamma voltage) corresponding to each grayscale may be corrected according to a change in the pixel low-potential voltage EVSS. Accordingly, image quality deterioration caused by a change in the pixel low-potential voltage EVSS may be prevented or minimized.

Figure 16:
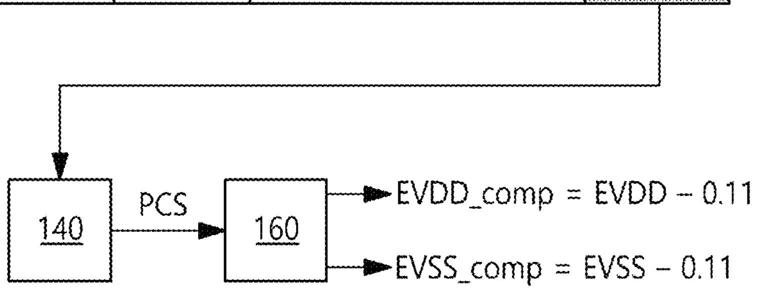
FIG. 16 is a view illustrating a process of applying a compensation driving voltage to a display panel, accounting for a deterioration characteristic of a driving transistor, in a display driving method according to embodiments of the disclosure.

FIG. 16 is a view illustrating a process of applying a compensation driving voltage to a display panel, accounting for a deterioration characteristic of a driving transistor, in a display driving method according to embodiments of the disclosure.

Referring to FIG. 16, the display device 100 of the disclosure may determine the current-voltage characteristic I-V Curve [100] of the driving transistor DRT from three or more light emission currents IED1, IED2, and IED3 flowing through the source node of the driving transistor DRT in a state in which the driving transistor DRT is turned off, and compensate for the pixel high-potential voltage EVDD or the pixel low-potential voltage EVSS with the compensation driving voltage corresponding to the light emission current IEDm of the maximum grayscale.

For example, if the deviation between the initial pixel low-potential voltage EVSS[0] and the reference voltage Vref for forming the light emission current IEDm of the maximum grayscale in the initial state was 2.2 V but, when reflecting the current-voltage characteristic I-V Curve [100] of the driving transistor DRT deteriorated after 100 hours of driving, the deviation between the changed pixel low-potential voltage EVSS[100] and the reference voltage Vref for forming the light emission current IEDm of the maximum grayscale is calculated as 2.31 V, it may be determined that the current-voltage curve of the driving transistor DRT has been shifted by the difference voltage (e.g., 0.11 V) between the initial pixel low-potential voltage EVSS[0] and the changed pixel low-potential voltage EVSS[100]. In this case, the shift voltage representing the deterioration characteristic of the driving transistor DRT may be referred to as the difference from the pixel low-potential voltage EVSS for forming the light emission current IEDm of the maximum grayscale.

Therefore, the compensation pixel high-potential voltage EVDD_comp and the compensation pixel low-potential voltage EVSS_comp may be supplied so as to be changed by the difference voltage (e.g., 0.11 V) between the initial pixel low-potential voltage EVSS[0] and the changed pixel low-potential voltage EVSS[100].

On the other hand, in order to compensate for the deterioration characteristics of the driving transistor DRT, the pixel high-potential voltage EVDD and the pixel low-potential voltage EVSS may be controlled at the same time, or the pixel high-potential voltage EVDD may be fixed and only the pixel low-potential voltage EVSS may be controlled.

Figure 17:
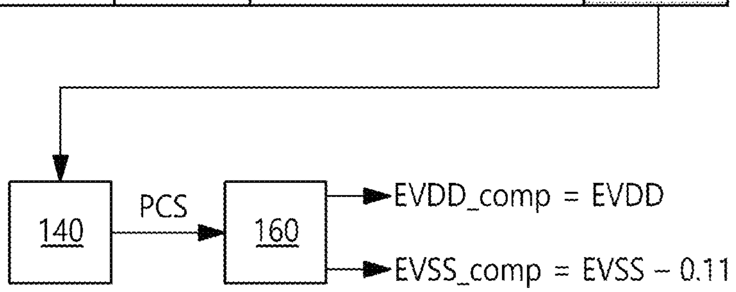
FIG. 17 is a view illustrating a process of compensating for a pixel low-potential voltage of a display panel, accounting for a deterioration characteristic of a driving transistor, in a display driving method according to embodiments of the disclosure.

FIG. 17 is a view illustrating a process of compensating for a pixel low-potential voltage of a display panel, accounting for a deterioration characteristic of a driving transistor, in a display driving method according to embodiments of the disclosure.

Referring to FIG. 17, the display device 100 of the disclosure may determine a current-voltage characteristic of the driving transistor DRT from the light emission current IED flowing through the source node of the driving transistor DRT in a state in which the driving transistor DRT is turned off, and apply the compensation pixel low-potential voltage EVSS_comp applied to the display panel 110 to form the light emission current IEDm of the maximum grayscale.

For example, if the deviation between the initial pixel low-potential voltage EVSS[0] and the reference voltage Vref for forming the light emission current IEDm of the maximum grayscale in the initial state was 2.2 V but, when reflecting the current-voltage characteristic I-V Curve [100] of the driving transistor DRT deteriorated after 100 hours of driving, the deviation between the changed pixel low-potential voltage EVSS[100] and the reference voltage Vref for forming the light emission current IEDm of the maximum grayscale is calculated as 2.31 V, it may be determined that the current-voltage curve of the driving transistor DRT has been shifted by the difference voltage (e.g., 0.11 V) between the initial pixel low-potential voltage EVSS[0] and the changed pixel low-potential voltage EVSS[100]. In this case, the shift voltage representing the deterioration characteristic of the driving transistor DRT may be referred to as the difference from the pixel low-potential voltage EVSS for forming the light emission current IEDm of the maximum grayscale.

Therefore, the controller 140 may control the power management circuit 160 to change the pixel low-potential voltage EVSS by the difference voltage (e.g., 0.11 V) between the initial pixel low-potential voltage EVSS[0] and the changed pixel low-potential voltage EVSS[100] and supply the compensation pixel low-potential voltage EVSS_comp.

As such, when only the compensation pixel low-potential voltage EVSS_comp is changed by reflecting the current-voltage characteristic of the driving transistor DRT, the fixed pixel high-potential voltage EVDD may be determined considering the variation width of the pixel low-potential voltage EVSS.

As such, when the characteristic value of the driving transistor DRT is compensated by controlling only the pixel low-potential voltage EVSS, power consumption may be decreased compared to when the pixel high-potential voltage EVDD and the pixel low-potential voltage EVSS are controlled together.

The display device 100 of the disclosure may alternately perform a process of detecting the characteristic value of the driving transistor DRT using the first subpixel group SPG1 formed in an area of the display panel 110 and a process of detecting the characteristic value of the driving transistor DRT by varying the pixel low-potential voltage EVSS.

Figure 18:
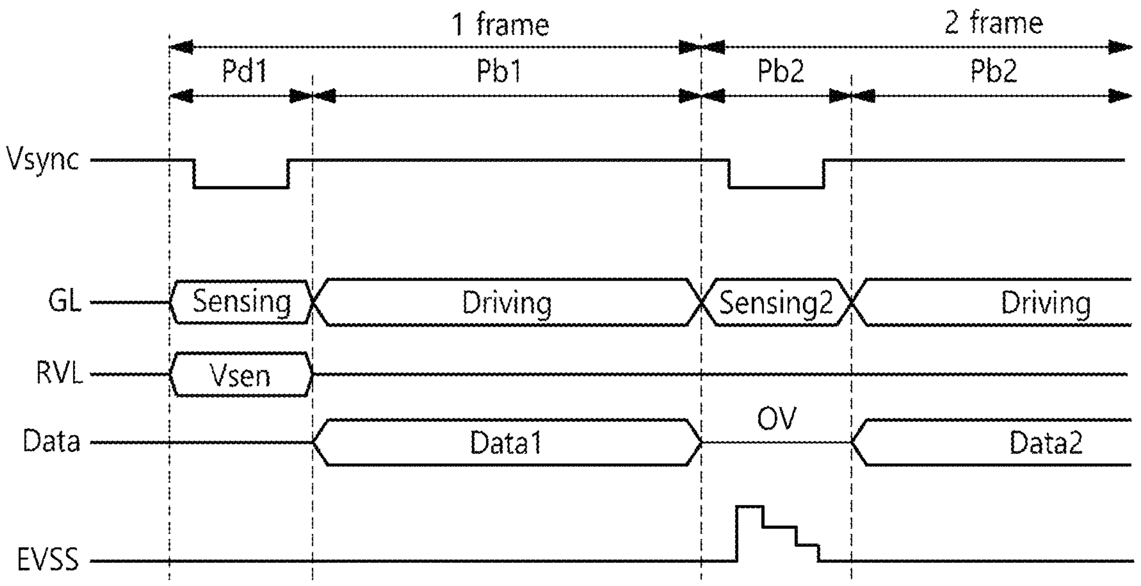
FIG. 18 is a signal flowchart illustrating an example of a process of detecting a first characteristic value of a driving transistor using a first subpixel group and a process of detecting a second characteristic value of the driving transistor by varying a pixel low-potential voltage in a display device according to embodiments of the disclosure.

FIG. 18 is a signal flowchart illustrating an example of a process of detecting a first characteristic value of a driving transistor using a first subpixel group and a process of detecting a second characteristic value of the driving transistor by varying a pixel low-potential voltage in a display device according to embodiments of the disclosure.

Referring to FIG. 18, the display device 100 of the disclosure may alternately perform a process of detecting the first characteristic value of the driving transistor DRT targeting the first subpixel group SPG1 formed in the display panel 110 and a process of detecting the second characteristic value of the driving transistor DRT by varying the pixel low-potential voltage EVSS.

For example, during the first blank interval Pb1 when the first image data Data1 is included in the first frame displayed on the display panel 110, the first characteristic value of the driving transistor DRT may be detected through the reference voltage line RVL targeting the first subpixel group SPG1 and, reflecting it, compensate for the data voltage.

In this case, in order to detect the first characteristic value of the driving transistor DRT, the first sensing gate signal Sensing1 for sensing the characteristic value may be applied through the gate line GL. Further, the first characteristic value of the driving transistor DRT may be the mobility of the driving transistor DRT.

Further, the current-voltage characteristic value of the driving transistor DRT may be detected by fixing the reference voltage Vref and varying the pixel low-potential voltage EVSS in a state in which the driving transistor DRT is turned off during the second blank interval Pb2 included in the second frame where the second image data Data2 is displayed on the display panel 110 and, by reflecting it, compensate for the driving voltage.

In this case, in the second blank interval Pb2, a second sensing gate signal Sensing2 capable of turning on the scan transistor SCT and the sensing transistor SENT may be applied through the gate line GL in order to detect the current-voltage characteristic value of the driving transistor DRT by varying the pixel low-potential voltage EVSS flowing through the light emitting element ED from the reference voltage line RVL. Further, a voltage (e.g., 0 V) capable of turning off the driving transistor DRT may be applied through the data line DL.

Further, the level of the pixel low-potential voltage EVSS may be changed to have three or more different levels during the second blank interval Pb2.

As described above, the display device 100 of the disclosure may compensate for the first characteristic value of the driving transistor DRT in the first blank interval Pb1 through the first subpixel group SPG1 formed only in a partial area of the display panel 110, and simultaneously compensate for the threshold voltage variation of the driving transistor DRT due to the body effect in the second blank interval Pb2.

Here, an example of compensating for the first characteristic value due to the deterioration of the driving transistor DRT in the first blank interval Pb1 and compensating for the second characteristic value of the driving transistor DRT due to the body effect in the second blank interval Pb2 has been disclosed, but when the characteristic value sensing interval for the first subpixel group SPG1 is shortened, both the operation of sensing the first characteristic value and the operation of sensing the second characteristic value of the driving transistor DRT may be performed in one blank interval.

A display device and a display driving method according to embodiments of the disclosure may be described as follows.

A display device of the disclosure may comprise a display panel including a first subpixel group and a second subpixel group having different structures on a silicon substrate, a gate driving circuit supplying a gate signal to the display panel, a data driving circuit supplying a data voltage to the display panel, and a timing controller controlling the gate driving circuit and the data driving circuit and sensing a characteristic value of a driving transistor included in the first subpixel group through a reference voltage line. In the first subpixel group, a first driving transistor included in each subpixel may be electrically connected to the reference voltage line through a sensing transistor, and in the second subpixel group, a second driving transistor included in each subpixel may not be electrically connected to the reference voltage line.

The second subpixel group may omit a sensing transistor connected to the second driving transistor.

The first subpixel group may include a subpixel line adjacent to the data driving circuit.

The first subpixel group may be constituted of one subpixel line adjacent to the data driving circuit.

In the first subpixel group, n (where n is a natural number of 2 or more) adjacent subpixels of the same color may be connected to one reference voltage line, and one pixel including subpixels of different colors may be simultaneously controlled by a pixel selection switch.

The timing controller may select a subpixel having a largest accumulated data voltage as a sensing target.

The display device may further comprise a power management circuit supplying a pixel high-potential voltage, a pixel low-potential voltage, and a reference voltage to the first subpixel group and varying the pixel low-potential voltage in a light emission current detection interval, and a light emission current sensor detecting a variation in a light emission current flowing to the first subpixel group through the sensing transistor in the light emission current interval. The timing controller may control the pixel low-potential voltage based on the variation in the light emission current.

In the light emission current interval, the data voltage may be applied at a turn-off level to maintain the first driving transistor in a turn-off state.

The pixel high-potential voltage may be supplied to a first electrode of the first driving transistor. The reference voltage may be supplied to a second electrode of the first driving transistor and an anode electrode of a light emitting element through the sensing transistor. The pixel low-potential voltage may be supplied to a cathode electrode of the light emitting element.

In the light emission current detection interval, the power management circuit may maintain the pixel high-potential voltage and the reference voltage at 0V and vary the pixel low-potential voltage among three or more different levels.

The pixel low-potential voltage may be varied within a range in which a deviation from the reference voltage is larger than a threshold voltage of the light emitting element.

The three or more different levels may have the same voltage interval.

The timing controller may determine a level of a compensation pixel low-potential voltage based on a deviation between an initial pixel low-potential voltage at which a maximum-grayscale light emission current flows and a current pixel low-potential voltage and supply the compensation pixel low-potential voltage to the display panel in a subsequent display interval.

The timing controller simultaneously may change the pixel high-potential voltage based on a deviation between an initial pixel low-potential voltage at which a maximum-grayscale light emission current flows and a current pixel low-potential voltage.

Further, a display driving method driving a display panel including a first subpixel group and a second subpixel group having different structures on a silicon substrate may comprise sensing a first characteristic value of a driving transistor included in the first subpixel group through a reference voltage line in a first sensing interval, varying a pixel low-potential voltage supplied to a cathode electrode of a light emitting element included in the first subpixel group and sensing a second characteristic value of the driving transistor, in a second sensing interval, and supplying a compensation voltage to the display panel according to the first characteristic value or the second characteristic value.

The first characteristic value may be a mobility of the driving transistor, and the second characteristic value may be a threshold voltage of the driving transistor.

Sensing the first characteristic value may sense the first characteristic value through a sensing transistor connecting the reference voltage line and the driving transistor.

Sensing the second characteristic value may include fixing a pixel high-potential voltage, a data voltage, and a reference voltage, turning off the driving transistor, detecting a light emission current for three or more pixel low-potential voltage levels, determining the second characteristic value based on the light emission current, and determining the compensation voltage using a maximum-grayscale light emission current.

The compensation voltage may be determined based on a deviation between an initial pixel low-potential voltage at which a maximum-grayscale light emission current flows and a current pixel low-potential voltage.

The first sensing interval may be a first blank interval, and the second sensing interval may be a second blank interval different from the first blank interval.

The above description has been presented to enable any person skilled in the art to make and use the technical idea of the disclosure and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

What is claimed:

1. A display device, comprising:

a display panel including a first subpixel group in a first display area and a second subpixel group in a second display area on a silicon substrate, the first subpixel group having different structures from the second subpixel group;

a gate driving circuit configured to supply a gate signal to the display panel;

a data driving circuit configured to supply a data voltage to the display panel; and a timing controller configured to control the gate driving circuit and the data driving circuit and sense a characteristic value of a driving transistor included in the first subpixel group through a reference voltage line, wherein the first display area is an area of the display panel adjacent to the data driving circuit, and a first driving transistor included in each subpixel of the first subpixel group is electrically connected to the reference voltage line through a sensing transistor, and wherein the second display area is an area of the display panel farther from the data driving circuit than the first display area in a plan view of the display device, and a second driving transistor included in each subpixel of the second subpixel group is not electrically connected to the reference voltage line.

2. The display device of claim 1, wherein the first subpixel group includes a first subpixel row adjacent to the data driving circuit among first to mth (where m is a natural number of 1 or more) subpixel lines.

3. The display device of claim 1, wherein in the first subpixel group, n (where n is a natural number of 2 or more) adjacent subpixels of a same color are connected to one reference voltage line, and wherein one pixel including subpixels of different colors is simultaneously controlled by a pixel selection switch.

4. The display device of claim 1, wherein the timing controller selects a subpixel having a largest cumulative data voltage as a sensing target.

5. The display device of claim 1, wherein the second subpixel group lacks a sensing transistor connected to the second driving transistor.

6. The display device of claim 1, further comprising:

a power management circuit configured to supply a pixel high-potential voltage, a pixel low-potential voltage, and a reference voltage to the first subpixel group and vary the pixel low-potential voltage in a light emission current detection interval; and a light emission current sensor configured to detect a variation in a light emission current flowing to the first subpixel group through the sensing transistor in the light emission current detection interval, wherein the timing controller controls the pixel low-potential voltage based on the variation in the light emission current.

7. The display device of claim 6, wherein in the light emission current detection interval, the data voltage is applied at a turn-off level that maintains the first driving transistor in a turn-off state.

8. The display device of claim 7, wherein the pixel high-potential voltage is supplied to a first electrode of the first driving transistor, wherein the reference voltage is supplied to a second electrode of the first driving transistor and an anode electrode of a light emitting element through the sensing transistor, and wherein the pixel low-potential voltage is supplied to a cathode electrode of the light emitting element.

9. The display device of claim 8, wherein in the light emission current detection interval, the power management circuit maintains the pixel high-potential voltage and the reference voltage at zero volts and varies the pixel low-potential voltage among three or more different levels.

10. The display device of claim 9, wherein the pixel low-potential voltage is varied within a range in which a deviation from the reference voltage is larger than a threshold voltage of the light emitting element.

11. The display device of claim 6, wherein the timing controller determines a level of a compensation pixel low-potential voltage based on a deviation between an initial pixel low-potential voltage at which a maximum-grayscale light emission current flows and a current pixel low-potential voltage and supplies the compensation pixel low-potential voltage to the display panel in a subsequent display interval.

12. The display device of claim 6, wherein the timing controller simultaneously changes the pixel high-potential voltage based on a deviation between an initial pixel low-potential voltage at which a maximum-grayscale light emission current flows and a current pixel low-potential voltage.

13. A display driving method driving a display panel including a first subpixel group and a second subpixel group having different structures on a silicon substrate, the display driving method comprising:

sensing a first characteristic value of a driving transistor included in the first subpixel group through a reference voltage line in a first sensing interval;

varying a pixel low-potential voltage supplied to a cathode electrode of a light emitting element included in the first subpixel group and sensing a second characteristic value of the driving transistor in a second sensing interval; and supplying a compensation voltage to the display panel according to the first characteristic value or the second characteristic value.

14. The display driving method of claim 13, wherein the first characteristic value is a mobility of the driving transistor and the second characteristic value is a threshold voltage of the driving transistor.

15. The display driving method of claim 13, wherein sensing the first characteristic value comprise sensing the first characteristic value through a sensing transistor connecting the reference voltage line and the driving transistor.

16. The display driving method of claim 13, wherein sensing the second characteristic value comprises:

fixing a pixel high-potential voltage, a data voltage, and a reference voltage;

turning off the driving transistor;

detecting a light emission current for three or more pixel low-potential voltage levels;

determining the second characteristic value based on the light emission current; and determining the compensation voltage using a maximum-grayscale light emission current.

17. The display driving method of claim 13, wherein the compensation voltage is determined based on a deviation between an initial pixel low-potential voltage at which a maximum-grayscale light emission current flows and a current pixel low-potential voltage.

18. The display driving method of claim 13, wherein the first sensing interval is included in a first blank interval and the second sensing interval is included in an interval different from the first blank interval.

* * * * *